(12) United States Patent
Komine et al.

(10) Patent No.: US 8,226,337 B2
(45) Date of Patent: Jul. 24, 2012

(54) TAP HOLDER

(75) Inventors: Tsuyoshi Komine, Higashi-Osaka (JP);
Hirokazu Suruga, Higashi-Osaka (JP)

(73) Assignees: Daishowa Seiki Co., Ltd., Osaka (JP);
Big Alpha Co., Inc., Hyogo (JP)

( * ) Notice: Subject to any disclaimer, the term of this patent is extended or adjusted under 35 U.S.C. 154(b) by 483 days.

(21) Appl. No.: 12/309,776

(22) PCT Filed: Mar. 6, 2007

(86) PCT No.: PCT/JP2007/054309
§ 371 (c)(1),
(2), (4) Date: Jan. 29, 2009

(87) PCT Pub. No.: WO2008/053606
PCT Pub. Date: May 8, 2008

(65) Prior Publication Data
US 2009/0209356 A1 Aug. 20, 2009

(30) Foreign Application Priority Data

Oct. 31, 2006 (WO) .................. PCT/JP2006/321755

(51) Int. Cl.
*B23B 31/107* (2006.01)
(52) U.S. Cl. ....... 408/238; 408/239 R; 470/96; 470/103; 279/16; 279/85; 279/86; 279/97
(58) Field of Classification Search .................. 408/127, 408/238, 239 A, 239 R; 279/16–18, 97, 103, 279/76, 83, 85, 86; 470/96, 103, 181, 903; *B23B 31/107*
See application file for complete search history.

(56) References Cited

U.S. PATENT DOCUMENTS

| | | | | |
|---|---|---|---|---|
| 1,315,100 A | * | 9/1919 | Dufresne | 408/140 |
| 1,425,359 A | * | 8/1922 | Barry | 81/53.2 |
| 1,702,810 A | * | 2/1929 | Buhr | 279/97 |
| 1,782,633 A | * | 11/1930 | Schiltz | 279/16 |
| 1,789,830 A | * | 1/1931 | Ostlund | 279/16 |
| 2,244,143 A | * | 6/1941 | Dowler | 192/66.2 |
| 2,484,027 A | * | 10/1949 | Haffey | 279/16 |
| 2,570,752 A | * | 10/1951 | Benjamin et al. | 279/16 |
| 2,574,016 A | * | 11/1951 | Burg | 408/127 |
| 2,772,094 A | * | 11/1956 | Jamilkowski et al. | 279/16 |
| 3,178,739 A | * | 4/1965 | Plummer et al. | 408/141 |
| 3,553,753 A | * | 1/1971 | Hundley | 470/96 |

(Continued)

FOREIGN PATENT DOCUMENTS

JP     59-8725     1/1984

(Continued)

*Primary Examiner* — Eric A Gates
(74) *Attorney, Agent, or Firm* — Jordan and Hamburg LLP

(57) ABSTRACT

It is an object of the invention to provide a tap holder in which even when an error is brought about in synchronizing spindle feeding and rotation of a tapper body and a tap collet of a tap holder in correspondence with a machine tool spindle, the synchronization can be established by absorbing the error by a simple constitution. As means therefor, the tap holder is characterized in that a tapper body and a tap collet are inserted by a locking member at portions of the tapper body and the tap collet overlapping each other, and the tap collet is fixed to the tapper body by engaging the locking member with at least one of the tap collet and the tapper body in a state of being interposed with an elastic member on both sides thereof in an axial direction X.

9 Claims, 23 Drawing Sheets

U.S. PATENT DOCUMENTS

| | | | |
|---|---|---|---|
| 3,945,751 A * | 3/1976 | Johnson | 408/127 |
| 4,080,090 A * | 3/1978 | Kern | 408/59 |
| 4,385,854 A * | 5/1983 | Miyakawa | 408/127 |
| 4,514,115 A * | 4/1985 | Akashi | 408/139 |
| 4,547,101 A * | 10/1985 | Dowdakin, Sr. | 408/127 |
| 4,984,942 A * | 1/1991 | Holtz | 408/127 |
| 5,704,738 A * | 1/1998 | Sugino et al. | 408/1 R |
| 5,882,015 A * | 3/1999 | McPherson | 279/16 |
| 5,915,892 A | 6/1999 | Glimpel et al. | |
| 6,348,003 B1 * | 2/2002 | Johnson et al. | 470/96 |
| 7,513,720 B2 * | 4/2009 | Wickham | 408/127 |
| 7,708,506 B2 * | 5/2010 | Johnson et al. | 408/238 |
| 2006/0285933 A1 * | 12/2006 | Johnson et al. | 408/141 |
| 2009/0324351 A1 * | 12/2009 | Komine et al. | 408/240 |

FOREIGN PATENT DOCUMENTS

| | | |
|---|---|---|
| JP | 7-60544 | 3/1995 |
| JP | 2000-61729 | 2/2000 |
| JP | 2002-46020 | 2/2002 |
| JP | 2004-142033 | 5/2004 |

* cited by examiner

TAP HOLDER

BACKGROUND OF THE INVENTION

The present invention relates to a tap holder for holding a tap for tapping and for equipping with a machine tool spindle.

When tapping is carried out by a machine tool by utilizing synchronization with feeding and rotation of a machine tool spindle, rotation and feeding of the machine tool spindle are controlled to synchronize in accordance with a pitch of a tap. However, in actual tapping, owing to a phenomenon referred to as servo delay, an amount of running a tap while machining by rotating becomes larger, or conversely smaller than a tap pitch per rotating the machine tool spindle, tapping is progressed fast or slow by an incoincidence of spindle feeding and rotation, and therefore, a deviation is brought about among an amount of spindle feeding per rotation and a tap pitch. Although in a background art, the incoincidence is prevented by providing floats on both sides in an axial direction of a tap holder, in recent years, the floats are eliminated and the tap holder are an integral structure is constituted by a promotion in an accuracy of synchronizing (synchronizing) spindle rotation and feeding by a development of a mechanism or a control technology.

Further, a tap holder deals therewith by being separated into a tapper body and a tap collet to allow a size of a tap by the tap collet. Also a synchronized tap holder constituting an object of complete synchronization is separated into a tapper body and a tap collet and when the tapper body and the tap collet are connected, the tap collet is attached thereto as gapless as possible.

However, although a synchronization accuracy of the machine tool is promoted, for example, when a spindle feeding direction and a spindle rotating direction are switched in order to draw a tap from a subject work, rotation of a machine tool spindle does not synchronize with spindle feeding and a small sift of the tap in an axial direction cannot completely be excluded from being brought about, and therefore, there is a drawback of enlarging or leaning a screw thread.

As a constitution of absorbing such a synchronization error, there is proposed a constitution in which a tap mounting portion is made to be movable (able to sift) in a rotating axis direction of a spindle by connecting a spindle mounting portion and the tap mounting portion by way of a leaf spring (refer to Patent Reference 1, paragraph No. [0011] shown below), or a constitution in which as in a background art, a tension spring and a compression spring are urged in directions reverse to each other in an axial direction between a spindle and a tap collet and the tap collet is stopped at a position for balancing urge forces, when an error of feeding the spindle is brought about in tapping and a feed amount and a pitch of a tap are incoincident, the spindle is slid slightly in a direction of making the feed amount and the pitch coincident by reacting with an external force from the tap at a front end thereof (refer to Patent Reference 2, paragraph number [0030], FIG. 2 shown below), or a constitution in which a tap driver is provided with a spiral coil having a compressing performance and an extending performance, an attachment body is moved by a small amount in an axis line direction in accordance with a predetermined force exerted to a tap to be able to synchronize (refer to Patent Reference 3, paragraph number [0018], FIG. 2).

However, the constitutions described in Patent References 1 through 3 pose a problem that structures are complicated in any of the cases and cost becomes expensive.

Further, although Patent Reference 4 shown below describes a tap holding apparatus in which in order to lock a tap to a tap holding shaft, a lock bolt is used, at a position opposed to the lock bolt, an elastically deformable bush is filled between a fixing pin brought into contact with an outer peripheral face of a handle portion and an inner wall of a long hole provided at the tap holding shaft, the fixing pin and a lock ring is made to be pivotable in a circumferential direction relative to the tap holding shaft, and the bush is filled also at a gap between the fixing pin in an axial direction and the inner wall of the long hole (page 8, line 14 through page 9, line 10), such a tap holding apparatus prevents the lock bolt from being loosened by restraining a rotational force and a force in a direction of pressing the tap from being operated to the lock bolt and is not for restraining a synchronization error of spindle feeding and rotation of a spindle.

That is, the fixing pin arranged with the bush is brought into contact with an outer peripheral face of the tap operated with a force in an axial direction to lock when the synchronization error of feeding and rotation of the spindle of the machine tool is brought about, and therefore, the force in the axial direction operated to the tap is not sufficiently transmitted to the fixing pin, and even when the elastically deformable bush is arranged on a front side in the direction of pressing the fixing pin, a difference between an amount of moving the top holding shaft and an amount of spontaneously running the tap cannot be absorbed.

Further, Patent Reference 5 shown below discloses a tapper mechanism in which a first member and a second member are connected by a connecting pin and an elastic member in a ring-like shape, further, a clutch for reverse rotation and a connecting member (key member) are connected by the connecting pin and the elastic member (refer to paragraph numbers [0009], [0018] FIGS. 3, 7). However, even the elastic member arranged at either of the connecting pins is for alleviating an impact when a clutch for regular rotation is engaged, or for absorbing attachment error of the connecting member and the clutch for reverse rotation, and not for restraining a synchronization error between spindle feeding and rotation of the spindle.

Patent Reference 1: JP-A-7-60544
Patent Reference 2: JP-A-2004-142033
Patent Reference 3: JP-A-2002-46020
Patent Reference 4: JP-UM-A-59-8725
Patent Reference 5: JP-A-2000-61729

SUMMARY OF THE INVENTION

The invention has been carried out in consideration of the above-described point and it is an object thereof to provide a tap holder in which in a constitution of separating a tap holder in correspondence with a machine tool spindle to a tapper body and a tap collet, even when an error is brought about in synchronizing feeding and rotation of the machine tool spindle, an error between the tapper body and the tap collet can be absorbed by a simple constitution to synchronize the feeding and the rotation.

A tap holder according to the invention is including a tap collet for chucking a tap at one end thereof, and a tapper body for receiving an outer face side of other end of the tap collet in an axial direction to fix unrotatably, and attached to a machine tool having a tap synchronizingly feeding mechanism, and characterized by in which the tap collet and the tapper body are inserted with a locking member at portions of the tap collet and the tapper body overlapping each other, and in which the locking member engages the tap collet and the tapper body in a state of interposing an elastic member on both sides in an axial direction between the locking member and at least one of the tap collet and the tapper body.

According to the invention, an error of synchronizing spindle feeding and rotation of a machine tool spindle can be absorbed by a simple constitution by producing a small amount of movement in an axial direction between a tapper body and a tap collet.

Further, the tapper body and the tap collet as well as the locking member and the elastic member can be fabricated with high productivity and inexpensively by a simple structure by reducing basic constituent elements.

Further, by interchanging the elastic member, a difference in a tap size or a difference in a machined material, wear or an aging change can easily be dealt with.

DETAILED DESCRIPTION OF THE INVENTION

First Embodiment

A first embodiment of the invention will be explained in reference to the drawings as follows.

Figure 1:
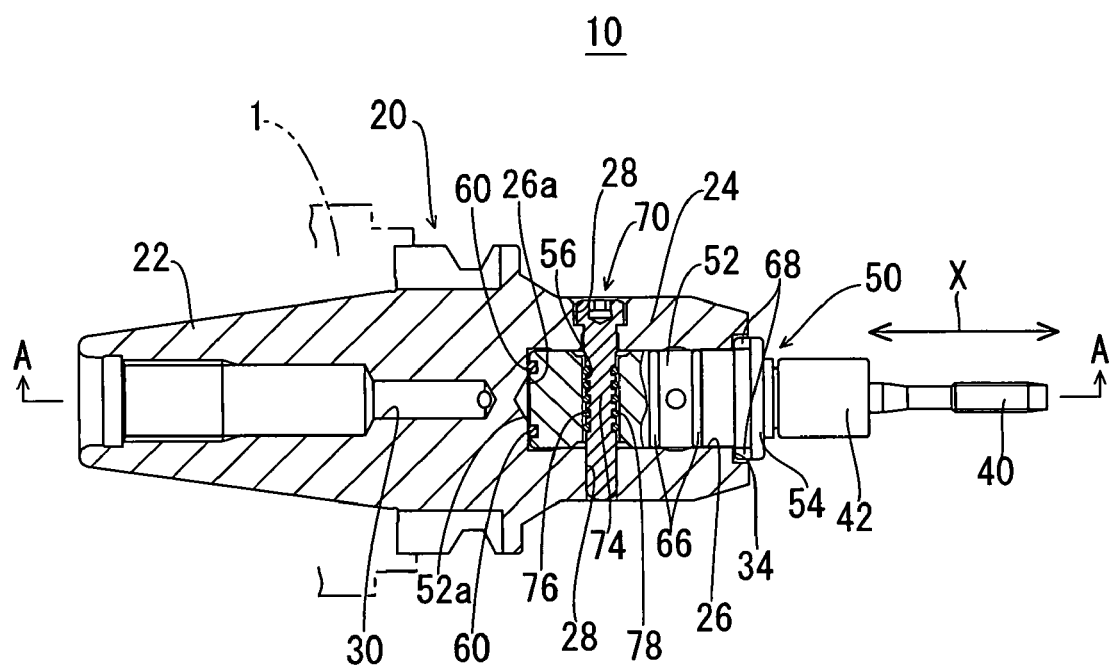
FIG. 1 is a sectional view of a tap holder according to a first embodiment of the invention.
Figure 2:
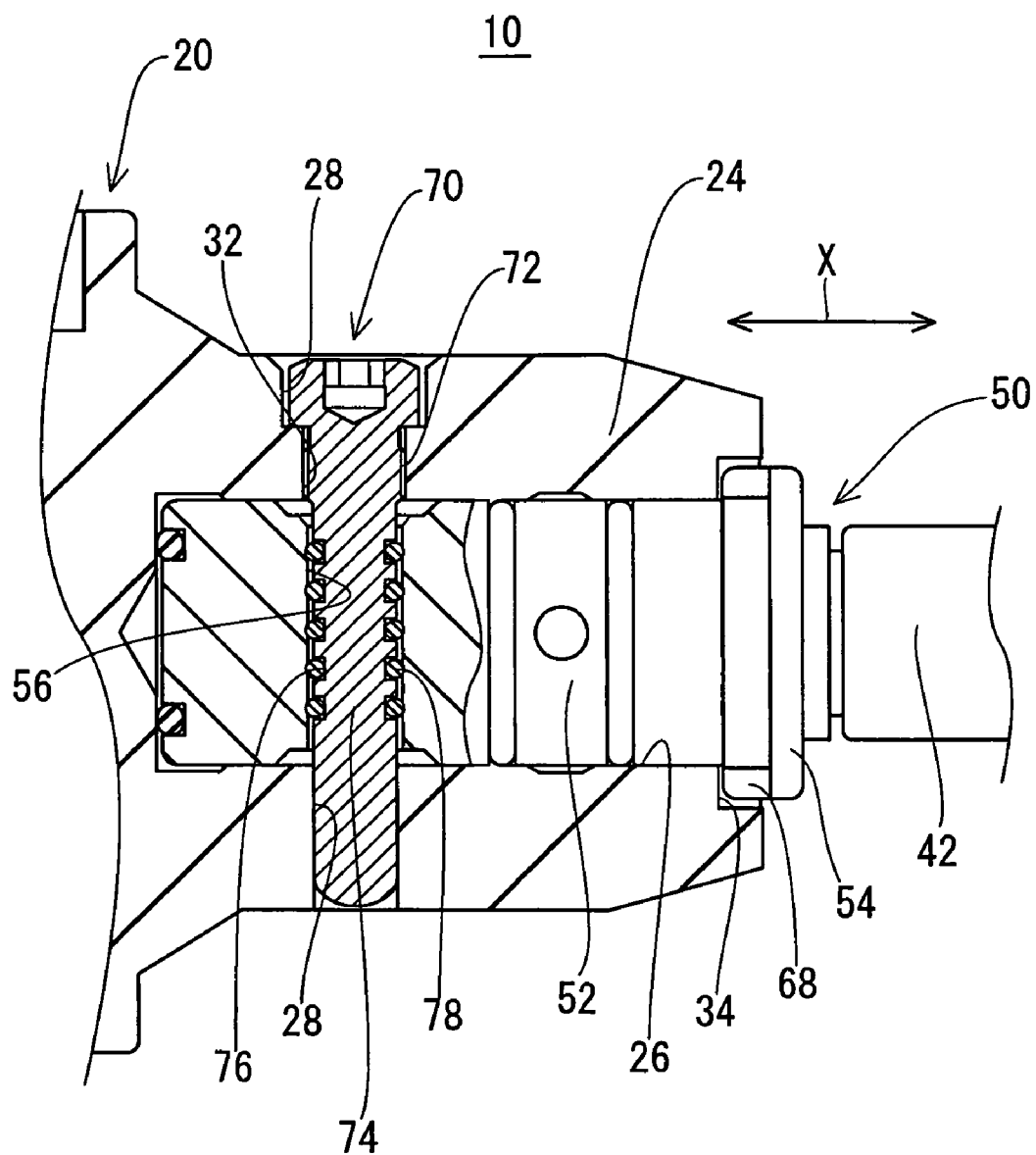
FIG. 2 is a sectional view enlarging an essential portion of the tap holder according to the first embodiment of the invention.
Figure 3:
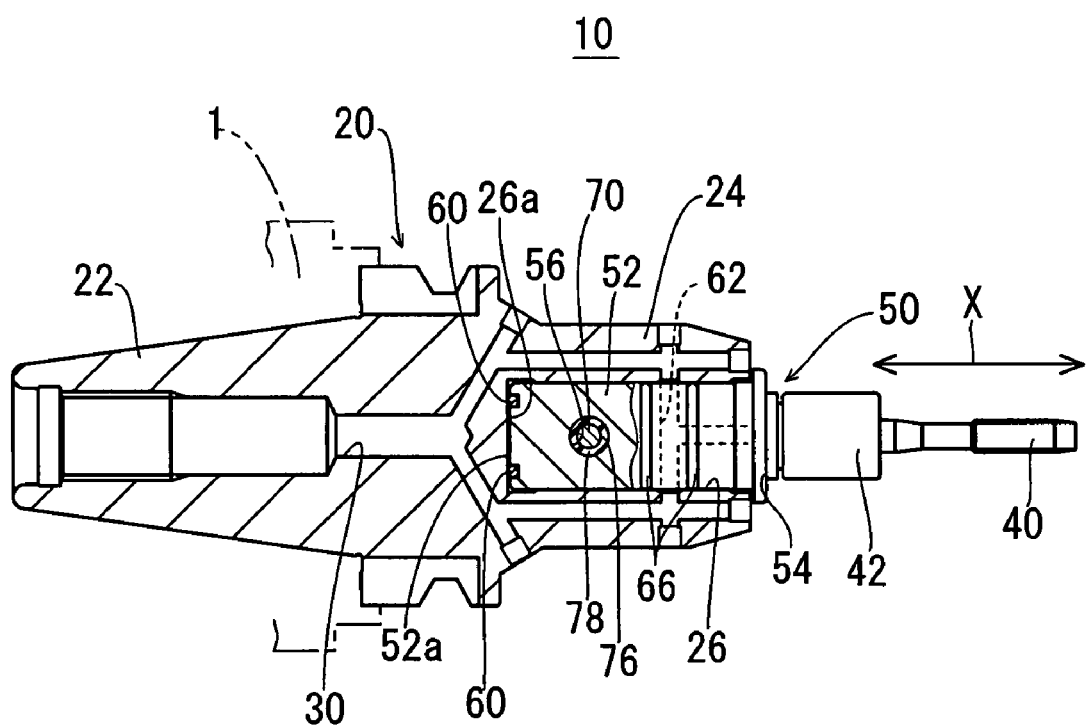
FIG. 3 is a sectional view taken along a line A-A of FIG. 1.
Figure 4:
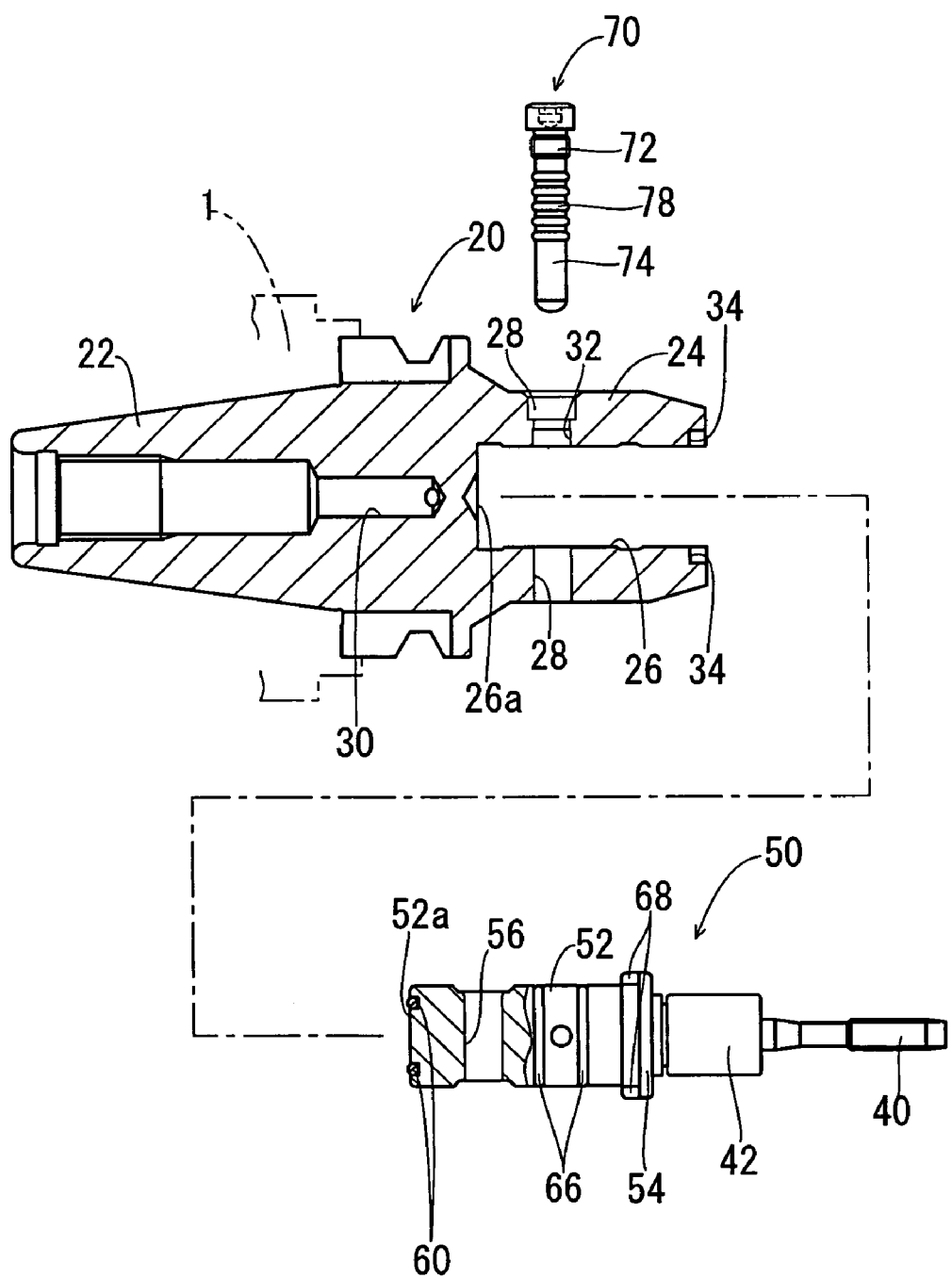
FIG. 4 is a disassembled view of the tap holder according to the first embodiment of the invention.

FIG. 1 is a sectional view of a tap holder 10 according to a first embodiment of the invention, FIG. 2 is a sectional view enlarging an essential portion of the tap holder 10, FIG. 3 is a sectional view taken along a line A-A of FIG. 1, and FIG. 4 is a disassembled view of the tap holder 10.

The tap holder 10 according to the embodiment is a tap holder for mounting a tap 40 to a machine tool having a tap synchronizingly feeding mechanism, having a tapper body 20 including a shank portion 22 attachably and detachably mounted to a spindle 1 of the machine tool, a tap collet 50 having a tap holding member 42 for holding the tap 40 at a front end thereof, and attachably and detachably attached to the tapper body 20, and a locking member 70 for connecting the tap collet 50 to the tapper body 20.

The tapper body 20 is provided with an outer cylinder portion 24 integrally with the shank portion 22 at a front end side thereof, the outer cylinder portion 24 is formed with an attaching hollow portion 26 for inserting a shaft portion 52 of the tap collet 50, and formed with through holes 28, 28 penetrated from an outer face of the outer cylinder portion 24 to the attaching hollow portion 26 in a diameter direction of the outer cylinder portion 24.

Further, an inner portion of the tapper body 20 is formed with a flow path 30 for pressurizing a cutting fluid, and the flow path 30 is opened to the attaching hollow portion 26.

The tap collet 50 includes the shaft portion 52 slidingly inserted into an inner peripheral face of the attaching hollow portion 26 of the tapper body 20 in a state of being brought into tight contact therewith, and a flange portion 54 provided at a front end side of the shaft portion 52.

The shaft portion 52 is provided with a through hole 56 penetrated in a diameter direction at a position in correspondence with the through hole 28 provided at the tapper body 20, the through hole 28 of the tapper body 20 and the through hole 56 of the tap collet 50 are communicated by inserting the shaft portion 52 into the attaching hollow portion 26, thereby, the locking member 70 is made to be able to be inserted to the outer cylinder portion 24 and the shaft portion 52 at which the tap collet 50 and the tapper body 20 are overlapped.

The locking member 70 includes a male screw portion 72, and a locking shaft portion 74 formed on a front end side of the male screw portion 72 and inserted to the through holes 28 and 56. A peripheral face of the locking shaft portion 74 is formed with a plurality of first recessed portions 76 in a groove-like shape continuous in a peripheral direction to be spaced apart from each other by predetermined intervals thereamong in an axial direction of the locking shaft portion 74, and the respective first recessed portions 76 are arranged with elastic members 78 to project from the locking shaft portion 74 to an outer side. The elastic member 78 is a ring-like member formed by a synthetic resin having an elasticity of nylon or the like or rubber and is removably arranged to the locking member 70.

The locking member 70 is fixed to the tapper body 20 by screwing the male screw portion 72 with a female screw portion 32 provided at an inner peripheral face of the through hole 28 in a state of inserting the locking shaft portion 74 to the through hole 28, 56, thereby, the tap collet 50 is engaged with the locking member 70 in a state of interposing the elastic members 78 on both sides in an axial direction of the tap collet 50 indicated by an arrow notation X, and is unrotatably fixed to the tapper body 20.

Further, an end face 52a of the shaft portion 52 opposed to a bottom face 26a of the attaching hollow portion 26 is arranged with a plurality of resin balls 60 to project from the end face 52a, and the bottom face 26a of the attaching hollow portion 26 and the resin balls 60 are brought into contact with each other. Further, the plurality of resin balls may be constituted by one O ring.

As shown by FIG. 3, an inner portion of the tap collet 50 is formed with a flow path 62 for pressurizing a cutting fluid, and an outer peripheral face of the shaft portion 52 is provided with an opening portion communicated with the flow path 62. The outer peripheral face of the shaft portion 52 is arranged with a pair of the O rings 66 by interposing the opening portion, in a state of connecting and fixing the tap collet 50 to the tapper body 20, the flow path 62 formed at the inner portion of the tap collet 50 is communicated with the flow path 30 formed at the inner portion of the tapper body 20, and the cutting fluid supplied from a side of the machine tool is pressurized to a blade tip portion of the tap 40 therethrough.

A side of the flange 54 of the tapper body 20 is formed with a projection 68 engaged with a key groove 34 formed at an opening edge of the hollow portion 26, and a rotational shift of the tap collet 50 relative to the tapper body 20 is hampered.

As described above, according to the tap holder 10 for the embodiment, the locking shaft portion 74 inserted into the through hole 56 of the tap collet 50 is engaged with the tap collet 50 in the state of interposing the elastic members 78 on both sides in the axial direction of the tap collet 50 indicated by the arrow mark notation X, and therefore, even when a force in either direction of a pressing direction and a pulling direction is generated at the tap collet 50 by the synchronization error of feeding and rotating the spindle 1 of the machine tool, the force is operated to the locking member 74 by way of the elastic member 78, a difference between an amount of moving the tapper body 20 and an amount of spontaneously running the tap 40 is absorbed by elastically deforming the elastic member 78 and highly accurate tapping can be carried out.

Further, the elastic member 78 is arranged to be removably fitted to the first recessed portion 76, and therefore, when the elastic member 78 is worn to deteriorate, the elastic member 78 can be interchanged by a new one thereof, a high tapping function can be maintained over a long period of time, an easiness of bending of the elastic member 78 can be adjusted by attaching the elastic member 78 having a different hardness to the first recessed portion 76, and the tap holder 10 suitable for working various kinds of materials can be provided.

Figure 5:
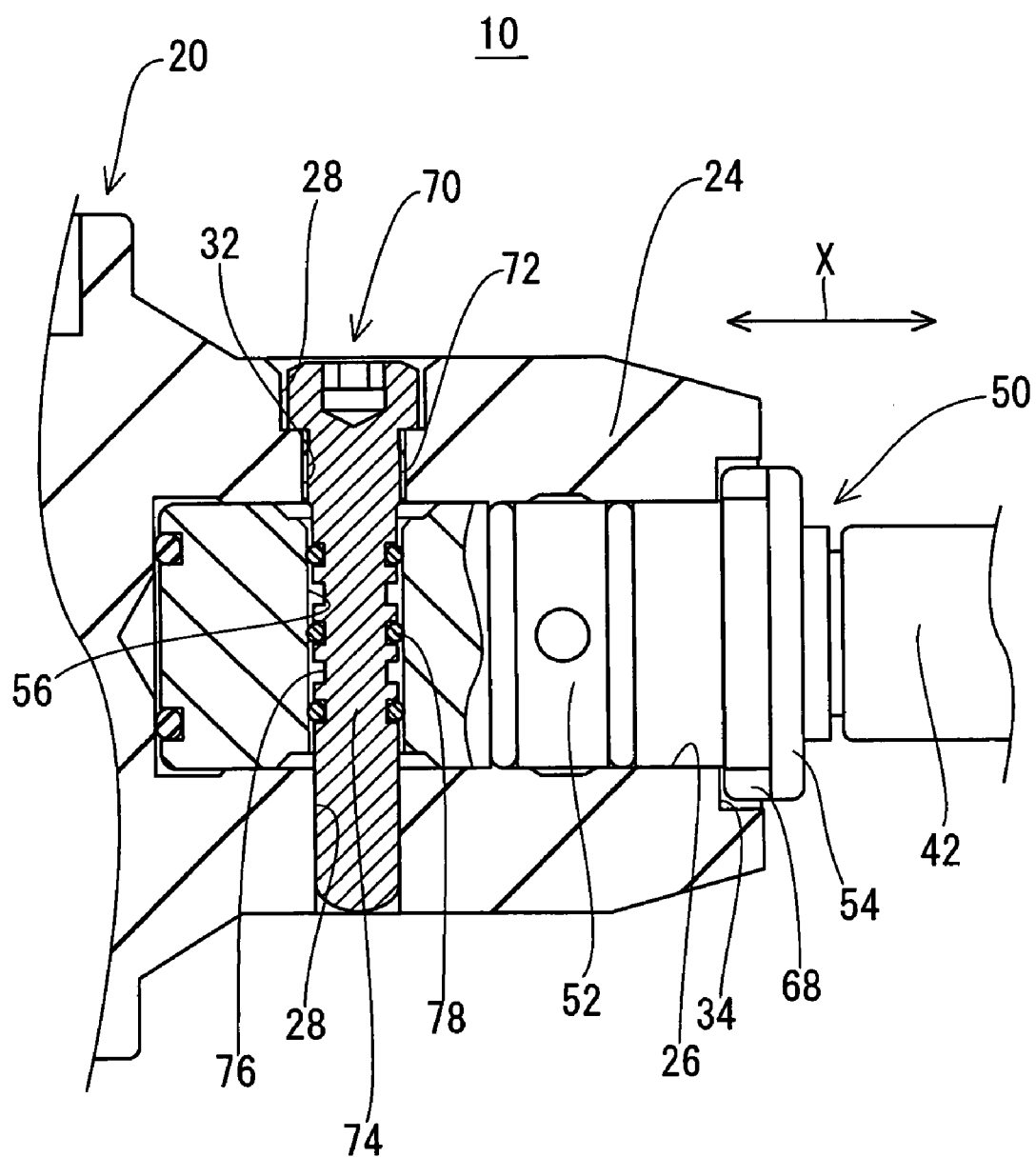
FIG. 5 is a sectional view enlarging an essential portion of a tap holder according to a modified example of the first embodiment of the invention.

Further, although according to the embodiment, the elastic members 78 are arranged to all of the plurality of first recessed portions 76 provided at the locking shaft portion 74, as exemplified in FIG. 5, by arranging the elastic members 78 at portions of the first recessed portions 76 and changing a number of the elastic members 78 interposed between the locking shaft portion 74 and the tap collet 50, the easiness of bending the elastic members 78 can be adjusted, and the tap holder 10 suitable for working various kinds of materials can be provided.

Figure 6:
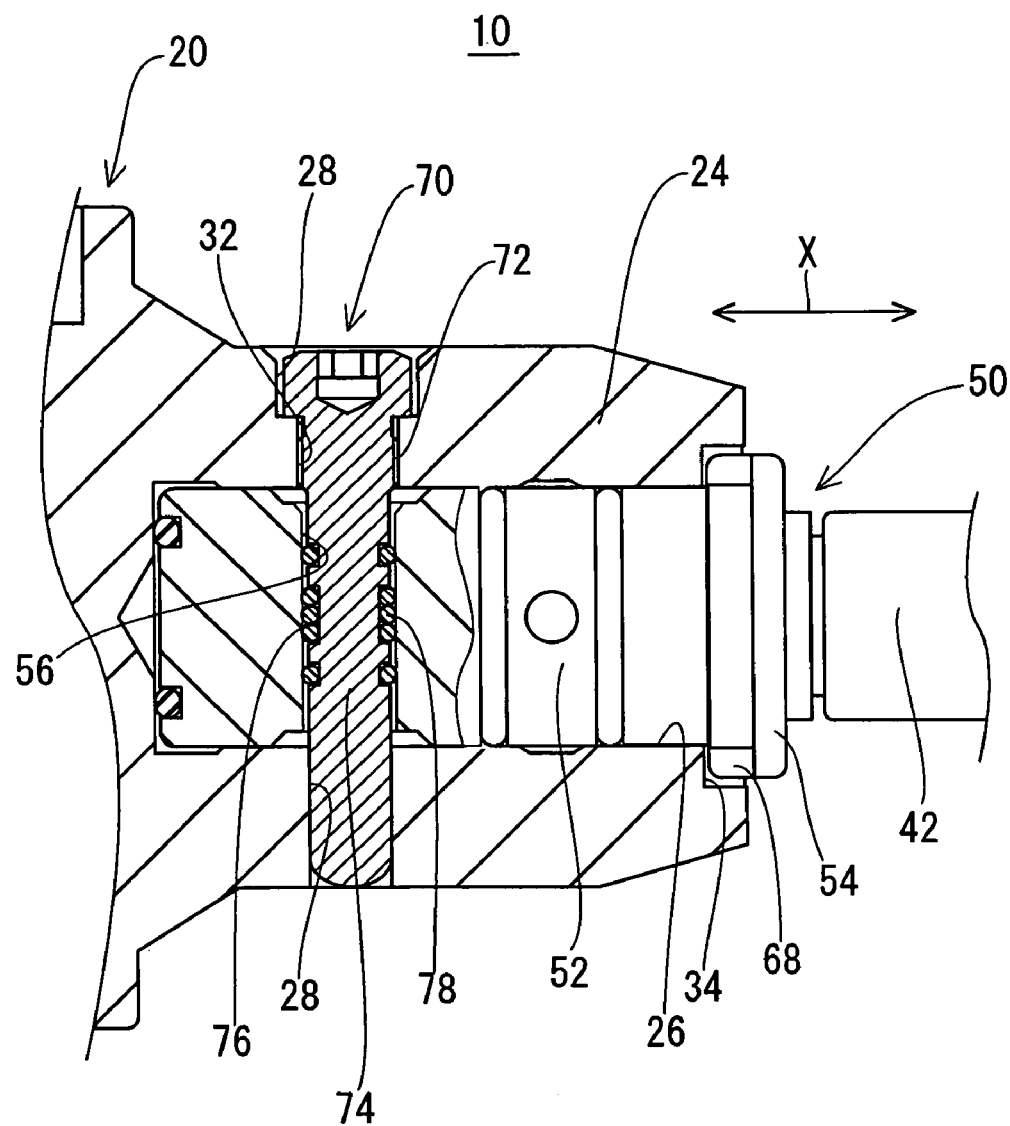
FIG. 6 is a sectional view enlarging an essential portion of a tap holder according to a modified example of the first embodiment of the invention.
Figure 7:
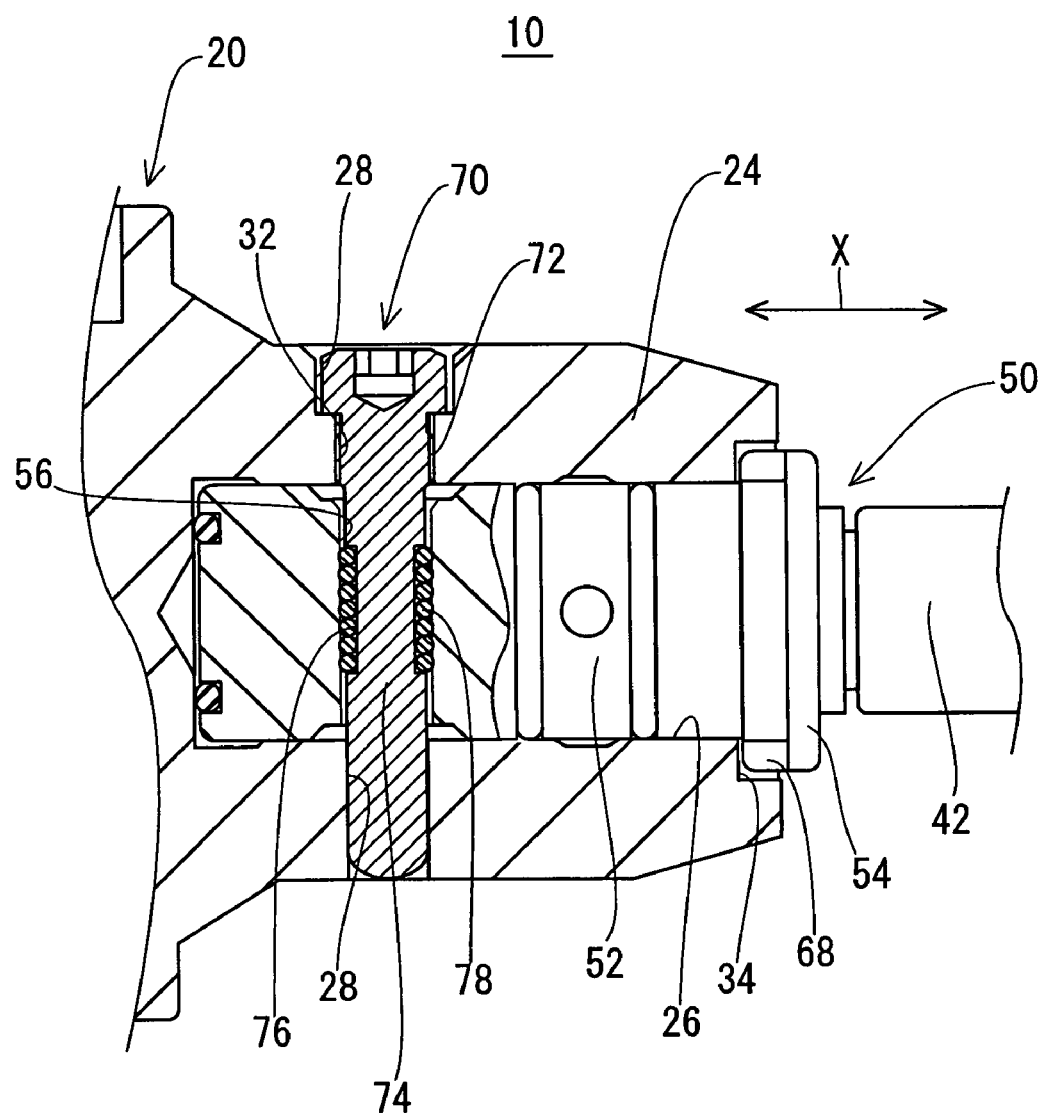
FIG. 7 is a sectional view enlarging an essential portion of a tap holder according to a modified example of the first embodiment of the invention.

Further, although according to the embodiment, the locking shaft portion 74 is provided with the plurality of first recessed portions 76, and the respective first recessed portions 76 are respectively arranged with single pieces of the elastic members 78, the invention is not limited thereto but, for example, as shown by FIG. 6 and FIG. 7, a single one of the first recessed portion 76 may be arranged with a plurality of the elastic members 78.

Furthermore, although according to the embodiment, the locking shaft portion 74 is engaged with the tap collet 50 by way of the elastic member 78, the locking shaft portion 74 may be engaged with the tapper body 20 in a state of interposing the elastic members 78 on both sides in the axial direction indicated by the arrow notation X.

Second Embodiment

Figure 8:
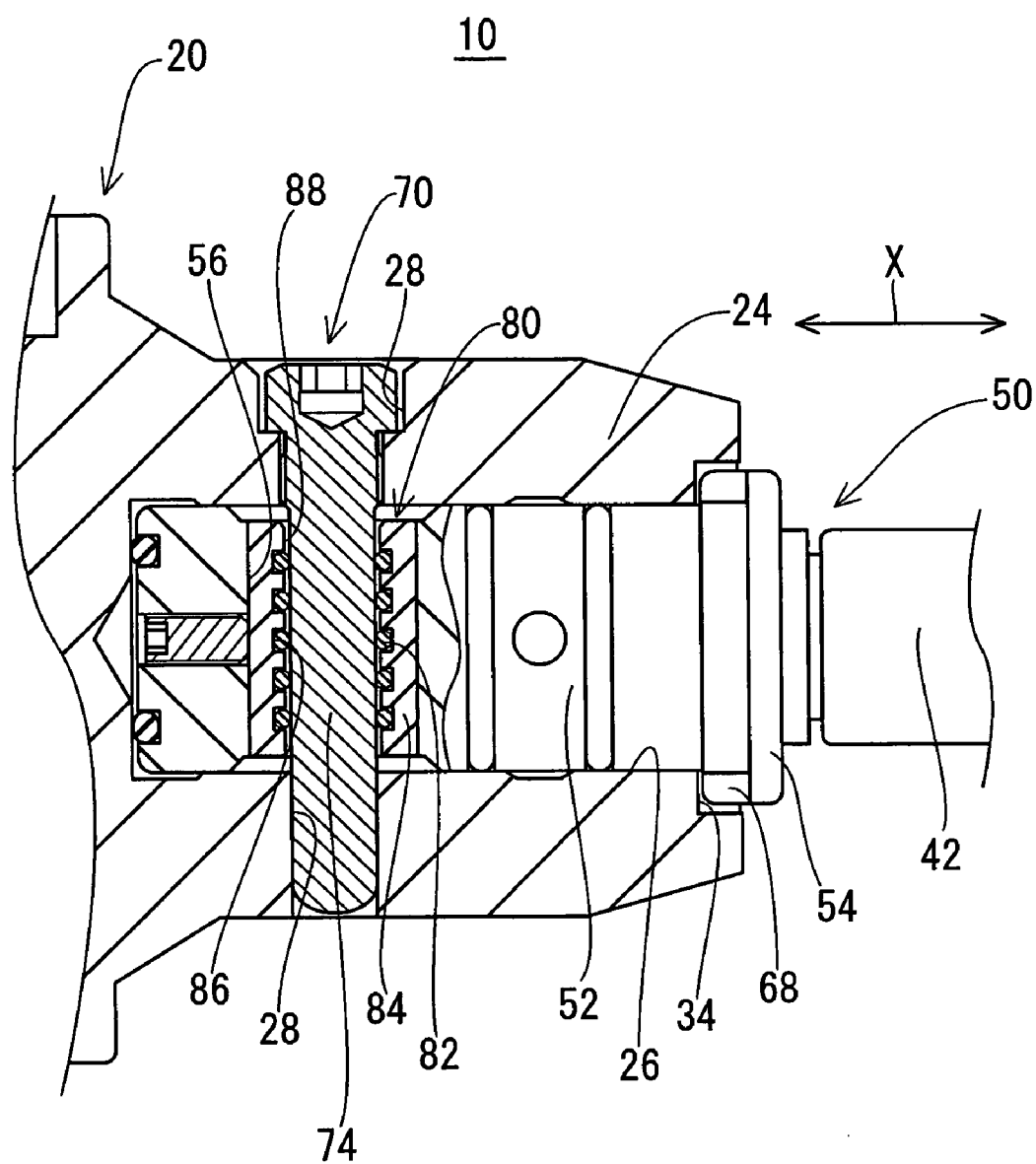
FIG. 8 is a sectional view enlarging an essential portion of a tap holder according to a second embodiment of the invention.
Figure 9:
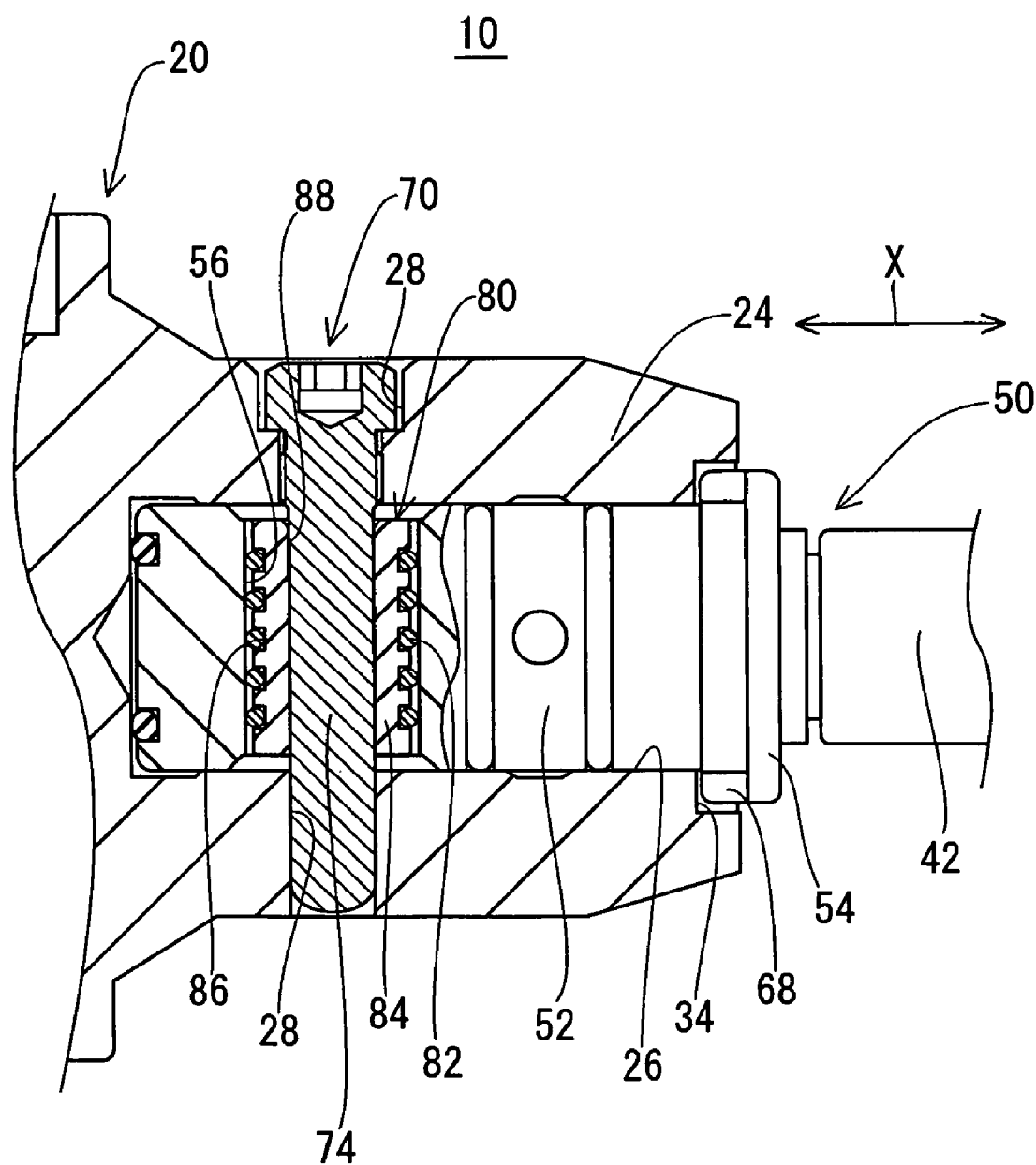
FIG. 9 is a sectional view enlarging an essential portion of a tap holder according to a modified example of the second embodiment of the invention.
Figure 10:
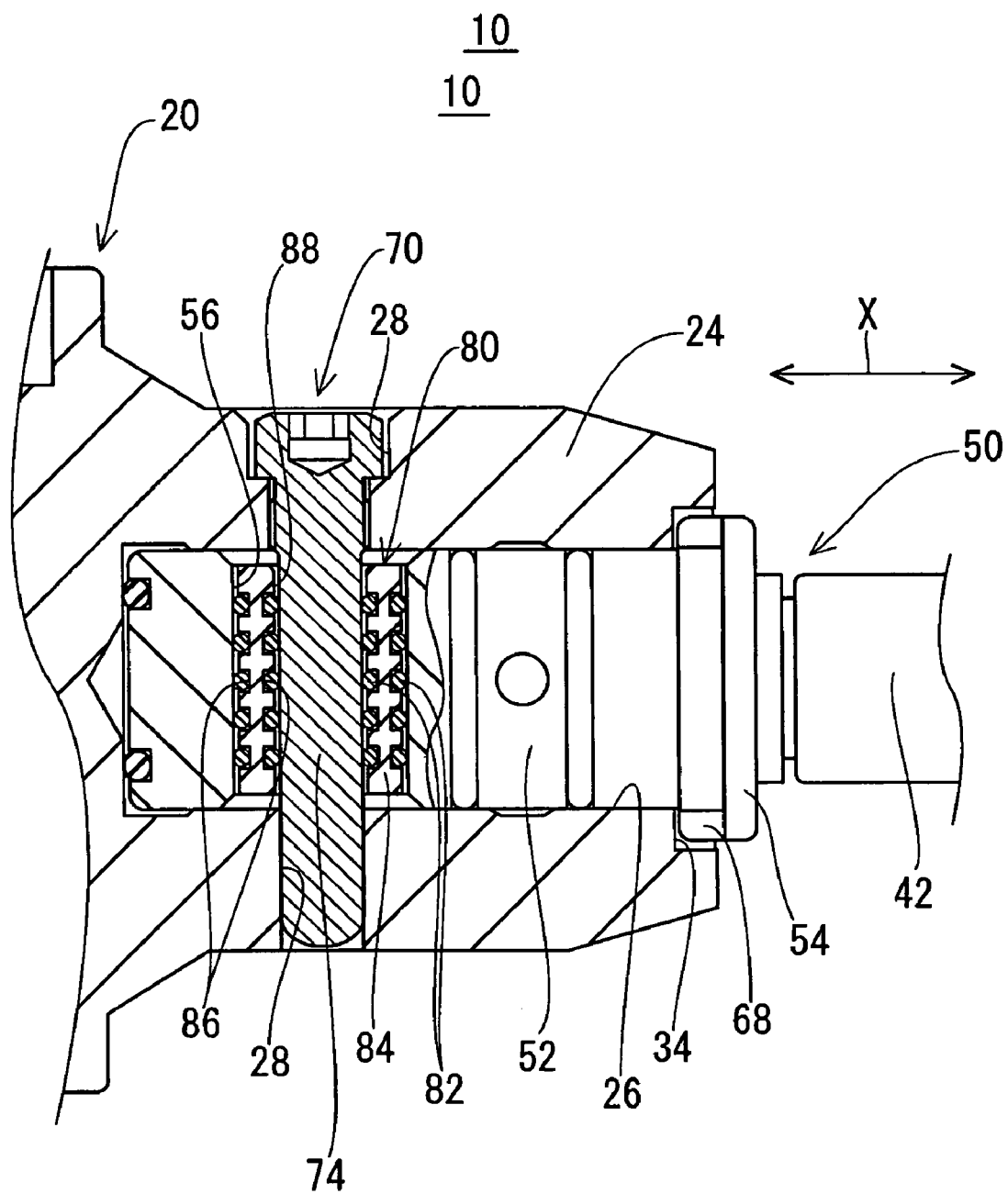
FIG. 10 is a sectional view enlarging an essential portion of a tap holder according to a modified example of the second embodiment of the invention.

A second embodiment will be explained in reference to FIG. 8 through FIG. 10. Elements the same as or corresponding to those of the first embodiment are attached with the same notations and a duplicated explanation thereof will be omitted. FIG. 8 through FIG. 10 are sectional views enlarging an essential portion of the tap holder 10 according to the embodiment.

Although according to the first embodiment, the elastic member 78 is arranged at the first recessed portion 76 provided at the locking member 70, according to the tap holder 10 of the embodiment, an elastic member unit 80 including an elastic member 82 is interposed between the locking shaft portion 74 and the tap collet 50.

Specifically, the elastic member unit 80 includes, for example, a cylinder member 84 in a circular cylindrical shape formed by a material having a rigidity larger than that of the elastic member 82 having a material the same as that of the tap collet 50 and the elastic member 82 arranged at the cylinder member 84 and removably fitted to the through hole 56 provided at the shaft portion 52 of the tap collet 50, and a hollow portion 88 of the cylinder member 84 is inserted with the locking shaft portion 74 of the locking member 70.

As shown by FIG. 8 through FIG. 10, the elastic member unit 80 may be provided with a plurality of second recessed portions 86 continuous in one peripheral face of the inner peripheral face and an outer peripheral face of the cylinder member 84 or in both of the peripheral faces in a peripheral direction and to be spaced apart from each other by predetermined intervals thereamong in an axial direction, and the second recessed portion 86 may be arranged with the elastic member 82.

As described above, even in the tap holder 10 of the embodiment, by elastically deforming the elastic member 82, the difference between the amount of moving the tapper body 20 and the amount of spontaneously running the tap 40 can be absorbed and the highly accurate tapping can be carried out.

Further, by providing the second recessed portion 86 arranged with the elastic member 82 only at the outer peripheral face of the cylinder member 84, even when the locking member 70 is drawn or inserted in interchanging the tap collet 50 or the like, the locking shaft portion 74 and the elastic member are not rubbed directly by each other, and therefore, a durability of the elastic member 82 is promoted.

Third Embodiment

Figure 11:
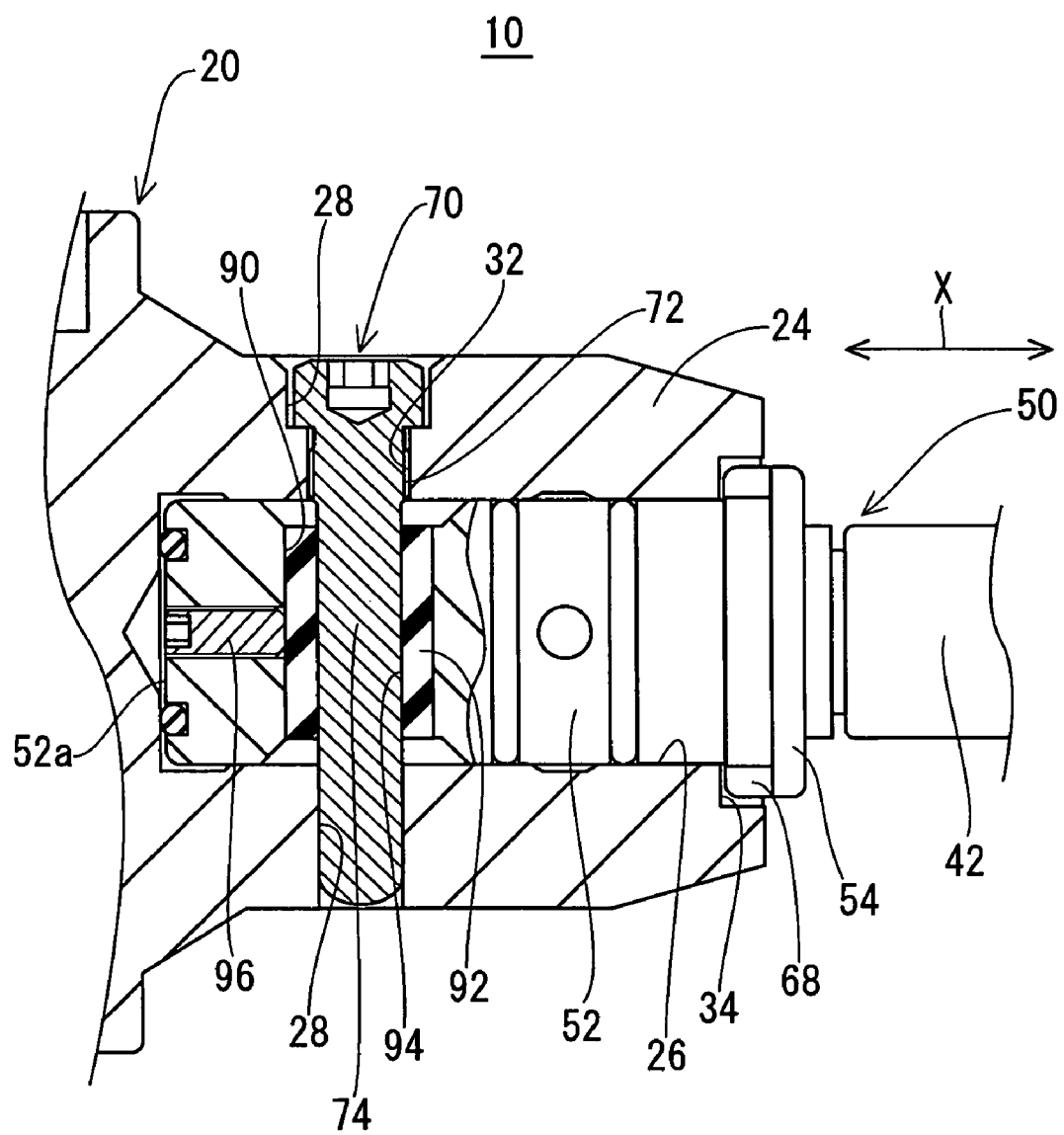
FIG. 11 is a sectional view enlarging an essential portion of a tap holder according to a third embodiment of the invention.

Next, a third embodiment will be explained in reference to FIG. 11. Elements the same as or corresponding to those of the first embodiment and the second embodiment are attached with the same notations and a duplicated explanation thereof will be omitted. FIG. 11 is a sectional view enlarging an essential portion of the tap holder 10 according to the embodiment.

A characteristic of the embodiment resides in that the elastic member for absorbing the difference between the amount of moving the tapper body 20 and the amount of spontaneously running the tap 40 is arranged at the tap collet 50.

That is, as shown by FIG. 11, the shaft portion 52 of the tap collet 50 is provided with a third recessed portion 90 penetrated in a diameter direction at a position in correspondence with the through hole 28 provided at the tapper body 20, and by inserting the shaft portion 52 into the attaching hollow portion 26, the through hole 28 at the tapper body 20 and the third recessed portion 90 at the tap collet 50 are communicated.

The third recessed portion 90 formed at the shaft portion 52 is removably fitted with an elastic member 92 in a cylindrical shape formed by a synthetic resin having an elasticity of nylon or the like or rubber, and the elastic member 92 is arranged at the third recessed portion 90 such that a hollow portion 94 of the elastic member 92 is communicated with the through hole 28 formed at the outer cylinder portion 24. The elastic member 92 is pressed to be fixed by a bolt 96 penetrated from the end face 52a of the shaft portion 52 to the third recessed portion 90.

The through hole 28 formed at the outer cylinder portion 24 and the hollow portion 94 of the elastic member 92 are inserted with the locking shaft portion 74 of the locking member 70 in the state of being brought into tight contact therewith, and the locking member 70 is fixed to the tapper body 20 by screwing the male screw portion 72 of the locking member 70 with the female screw portion 32 formed at the inner peripheral face of the through hole 28. Thereby, the tap collet 50 is engaged with the locking member 70 in the state of interposing the elastic member 92 on the both sides in the axial direction indicated by the arrow mark notation X to be fixed to the tapper body 20 unrotatably.

Modified Example 1 of Third Embodiment

Figure 12:
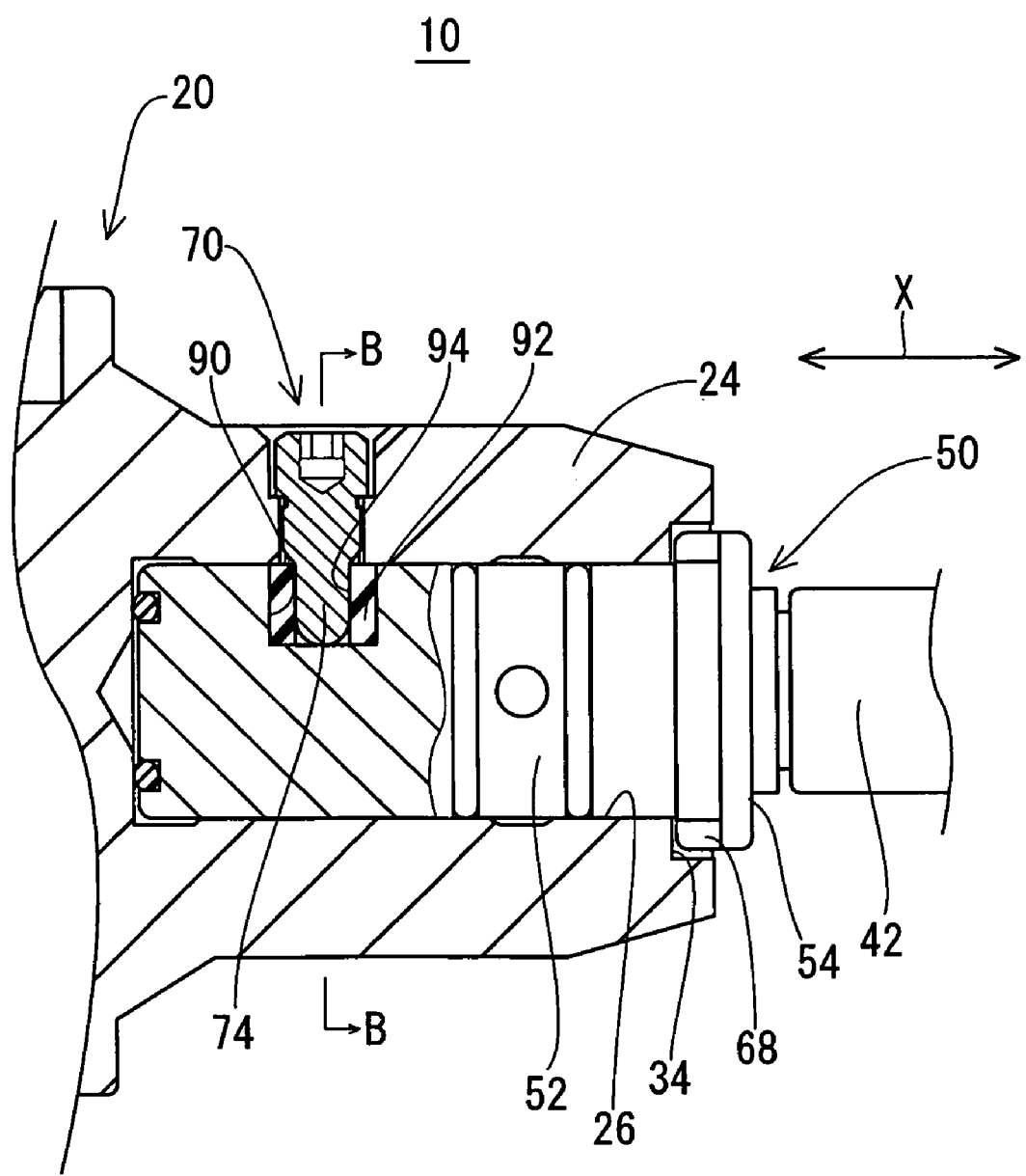
FIG. 12 is a sectional view enlarging an essential portion of a tap holder according to modified example 1 of the third embodiment of the invention.

Modified example 1 of the embodiment will be explained in reference to FIG. 12 and FIG. 13. Elements the same as or corresponding to those of the embodiment are attached with the same notations and a duplicated explanation thereof will be omitted. FIG. 12 is a sectional view enlarging an essential portion of the tap holder 10 according to the modified example and FIG. 13 is a sectional view taken along a line B-B of FIG. 12.

A point of a change from the embodiment resides in that the third recessed portion 90 formed at the shaft portion 52 of the tap collet 50 is not penetrated through the shaft portion 52.

Figure 13:
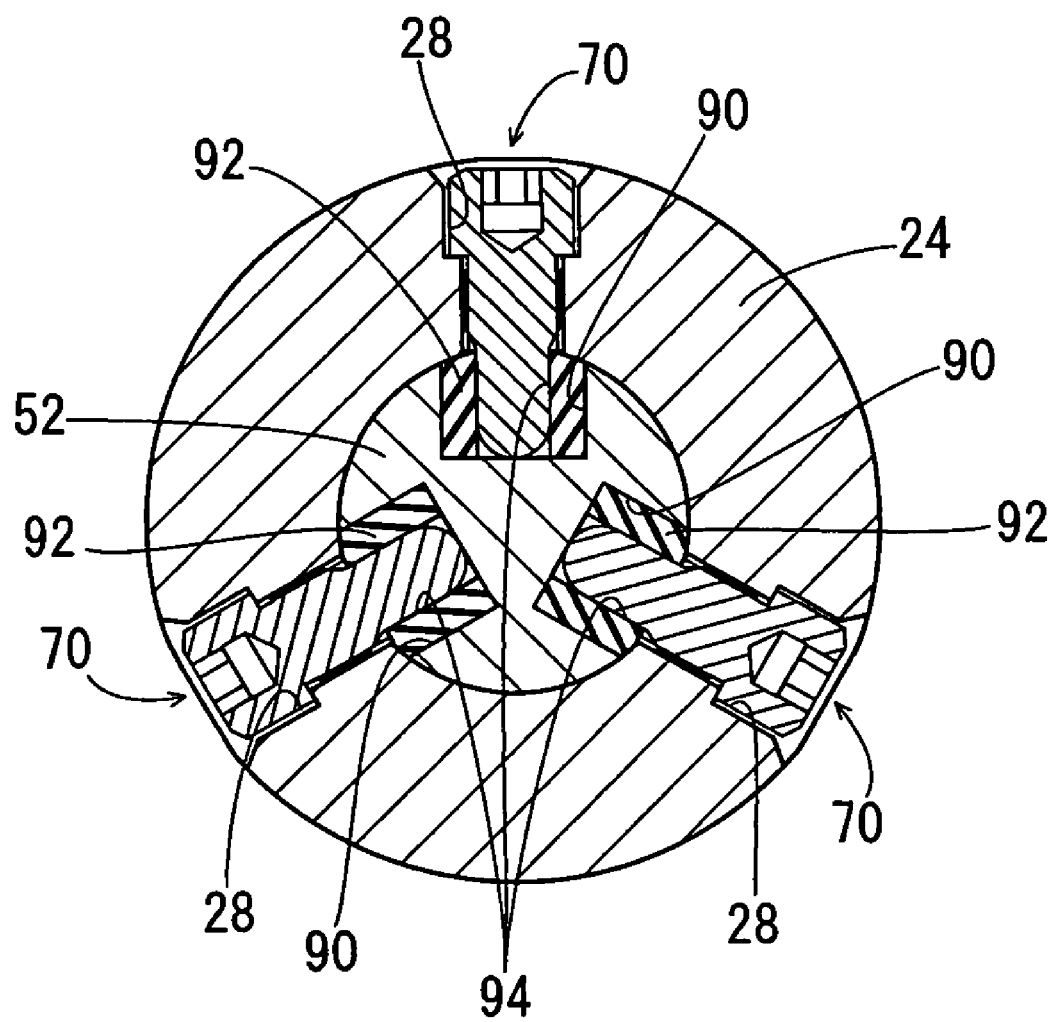
FIG. 13 is a sectional view taken along a line B-B of FIG. 12.

That is, as shown by FIG. 12 and FIG. 13, a plurality (for example, three) of the third recessed portions 90 are arranged in the peripheral direction at equal intervals without penetrating the shaft portion 52 and each of the third recessed portions 90 is fitted with the elastic member 92 in the cylindrical shape. Also a plurality of the through holes 28 are formed at the outer cylinder potion 24 in correspondence with the third recessed portions 90 to be communicated with the hollow portions 94 of the elastic members 92, and the tap collet 50 is fixed to the tapper body 20 by engaging the tap collet 50 and the locking member 70 by way of the elastic member 92 on the both sides in the axial direction indicated by the arrow mark notation X by inserting the locking shaft portion 74 of the locking member 70 to the through hole 28 and the hollow portion 94 of the elastic member 92.

Modified Example 2 of Third Embodiment

Figure 14:
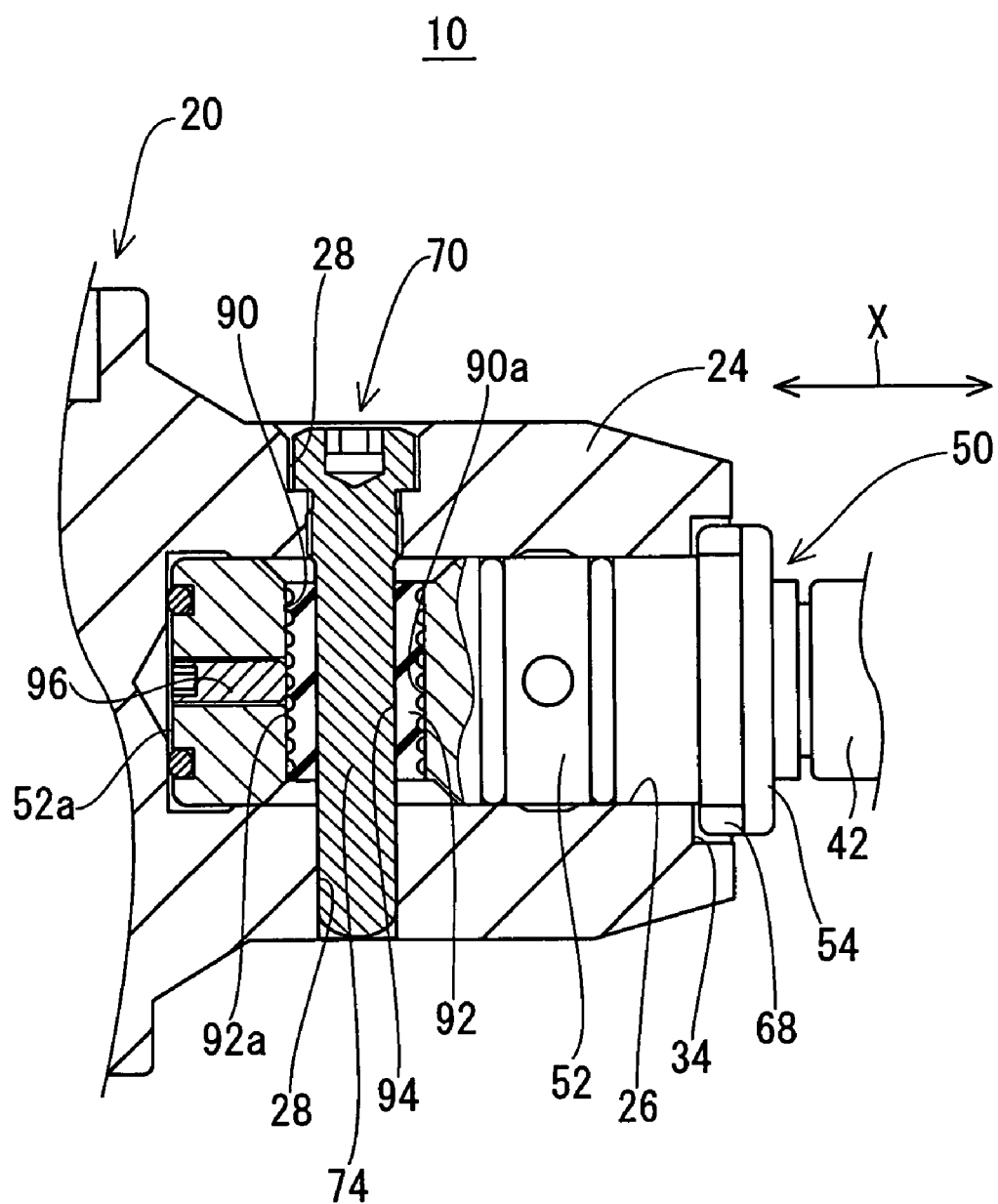
FIG. 14 is a sectional view enlarging an essential portion of a tap holder according to modified example 2 of the third embodiment of the invention.

Modified example 2 of the embodiment will be explained in reference to FIG. 14. Elements the same as or corresponding to those of the embodiment are attached with the same notations and a duplicated explanation thereof will be omitted. FIG. 14 is a sectional view enlarging an essential portion of the tap holder 10 according to the modified example.

As shown by FIG. 14, according to a characteristic of the modified example, a side face 92a of the elastic member 92 in the cylindrical shape inserted to the third recessed portion 90 formed at the shaft portion 52, for example, a face thereof brought into contact with an inner wall 90a partitioning the third recessed portion 90 is constituted by a recessed and projected face.

By providing the side face 92a of the elastic member 92 by the recessed and projected face in this way, an easiness of bending the elastic member 92 can easily be adjusted by changing a contact area of the tap collet 50 and the elastic member 92, and the tap holder 10 suitable for machining various kinds of materials can be provided by only changing the elastic member 92. Although according to the modified example, the recessed and projected face is provided at the side face 92a constituting an outer periphery of the elastic member 92, otherwise, the recessed and projected face may be provided only at an inner periphery thereof, or the recessed and projected faces may be provided at both side faces.

Further, the contact area of the tap collet 50 and the elastic member 92 may be changed by a front side and a rear side of a direction of pressing the tap collet 50, in other words, by a case of operating a force in a pressing direction to the tap collet 50 and a case of operating a force in a direction of pulling thereto, thereby, the easiness of bending the elastic member 92 can respectively separately be adjusted for the force in the direction of pressing the tap collet 50 and the force in the direction of pulling the tap collet 50.

Modified Example 3 of Third Embodiment

Figure 15:
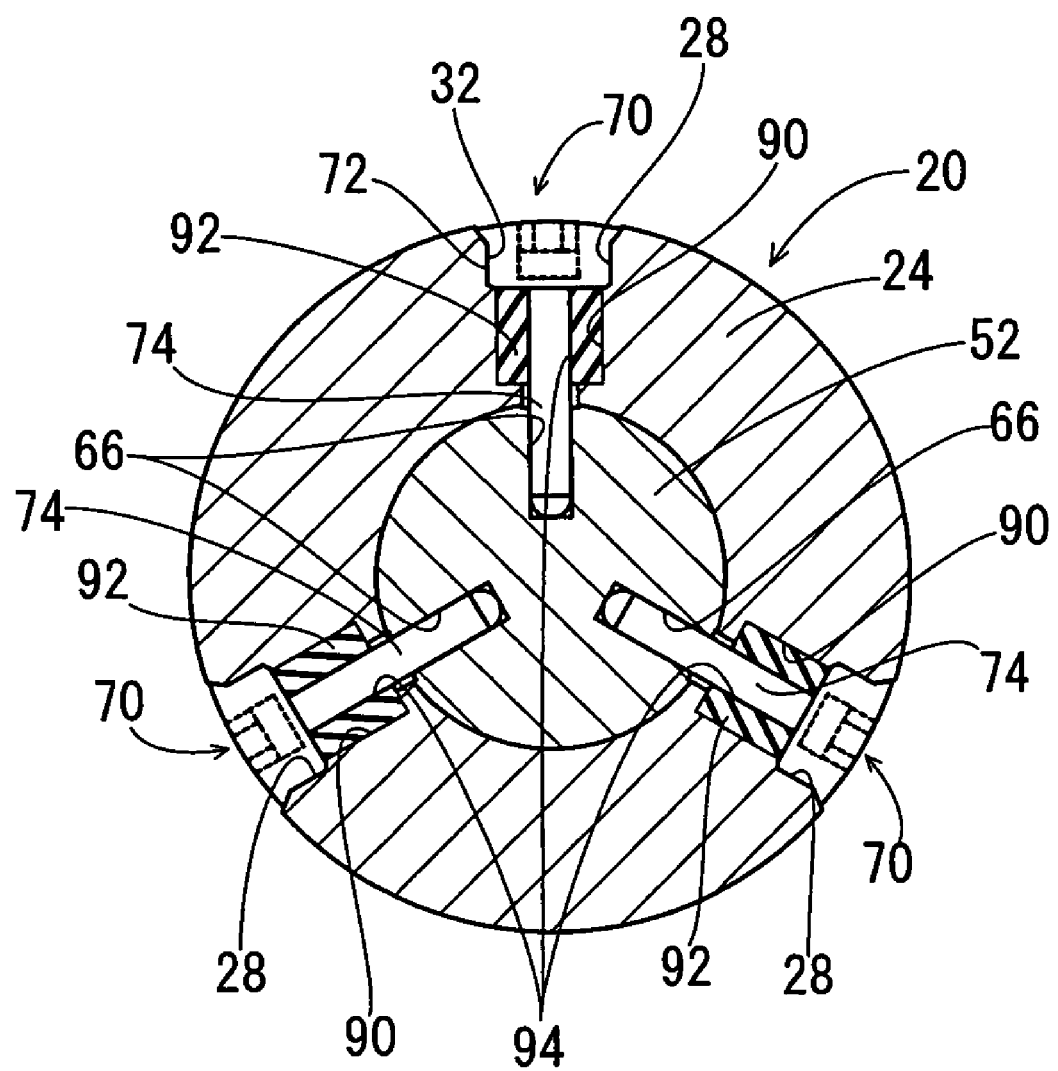
FIG. 15 is a sectional view of a tap holder according to modified example 3 of the third embodiment of the invention.

Modified example 3 of the embodiment will be explained in reference to FIG. 15. Elements the same as or corresponding to those of the embodiment are attached with the same notations and a duplicated explanation thereof will be omitted. FIG. 15 is a sectional view of the tap holder 10 according to the modified example.

A characteristic of the modified example resides in that the elastic member 92 is arranged at the tapper body 20.

That is, as shown by FIG. 15, the outer cylinder portion 24 of the tapper body 20 is arranged with a plurality (three in the embodiment) of the third recessed portions 90 in the peripheral direction without penetrating the outer cylinder potion 24. Each of the third recessed portions 90 is fitted with the elastic member 92 in the cylindrical shape, and the hollow portion 94 of the elastic member 92 is communicated with a stop hole 66 provided at a position in correspondence with each of the third recessed portions 90 at the shaft portion 52 of the tap collet 50. The tap collet 50 is fixed to the tapper body 20 by engaging the tap collet 50 and the locking member 70 by way of the elastic member 92 on the both sides in the axial direction indicated by the arrow mark notation X by inserting the locking shaft portion 74 of the locking member 70 into the stop hole 66 formed at the shaft portion 52 and the hollow portion 94 of the elastic member 92.

Modified Example 4 of Third Embodiment

Figure 16:
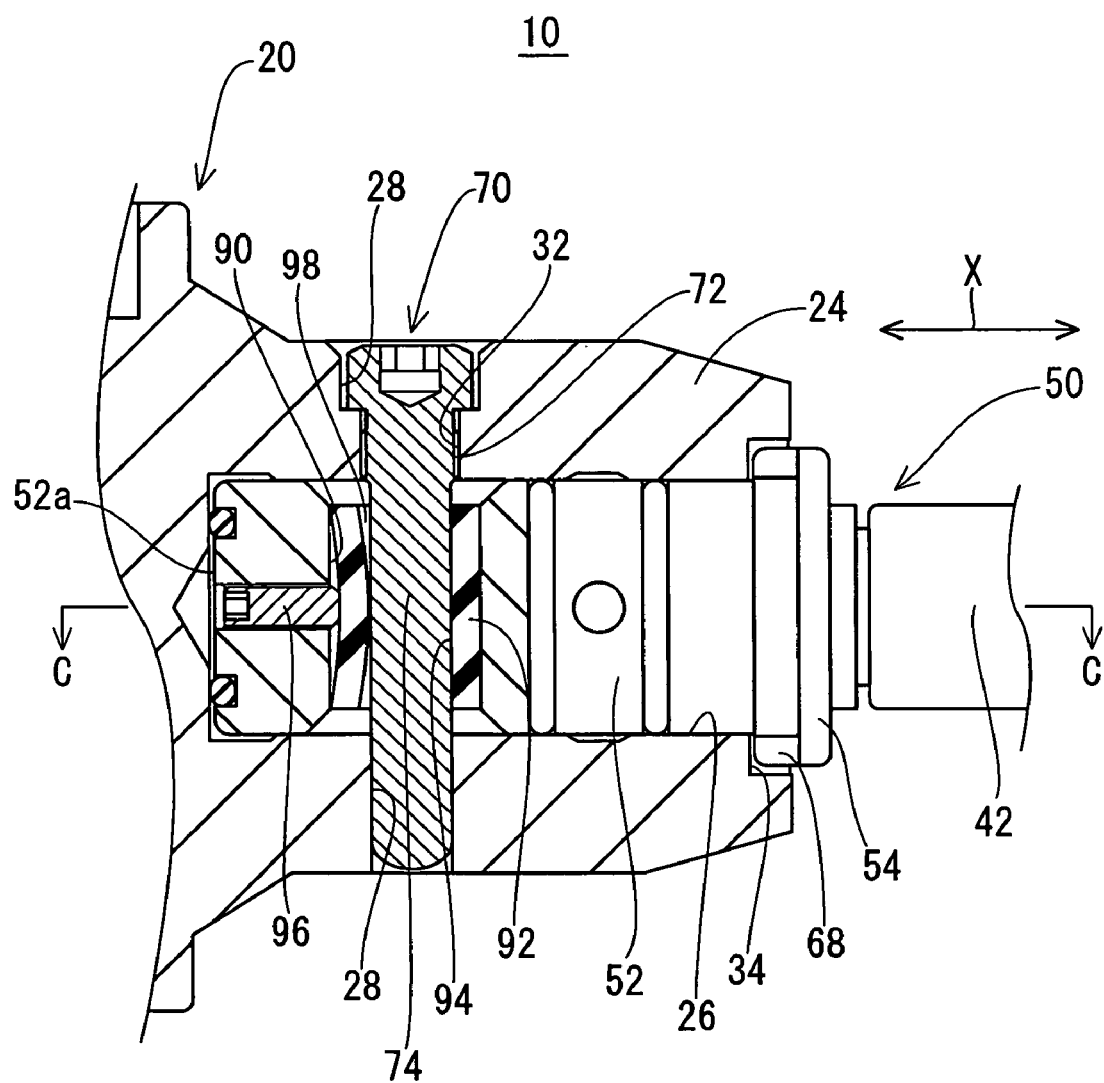
FIG. 16 is a sectional view enlarging an essential portion of a tap holder according to modified example 4 of the third embodiment of the invention.

Modified example 4 of the embodiment will be explained in reference to FIG. 16 through FIG. 20. Elements the same as or corresponding to those of the embodiment are attached with the same notations and a duplicated explanation thereof will be omitted. FIG. 16 is a sectional view enlarging an essential portion of the tap holder 10 according to the modified example, FIG. 17 is a sectional view taken along a line C-C of FIG. 16, and FIG. 18 through FIG. 20 are partial sectional views of the tap collet 50 in the state of being inserted with the locking member 70.

A characteristic of the modified example resides in that a clearance 98 constituting a margin of escaping the deformed elastic member 92 is provided between the elastic member 92 and the locking member 70.

Figure 17:
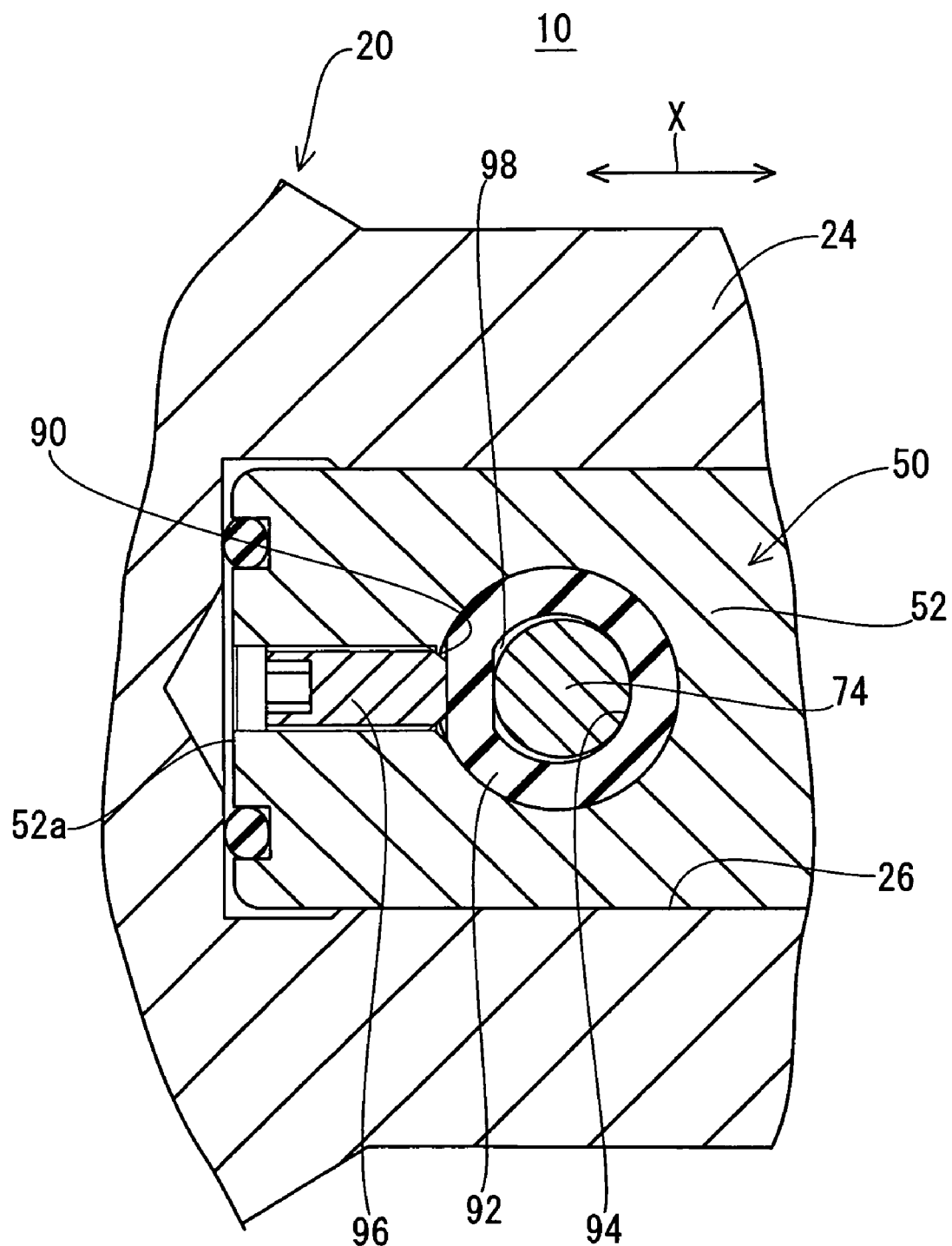
FIG. 17 is a sectional view taken along a line C-C of FIG. 16.

Specifically, as exemplified in FIG. 16 and FIG. 17, the clearance 98 is formed by forming an inner diameter of the hollow portion 94 of the elastic member 92 to be larger than an outer diameter of the locking shaft portion 74 and bending the elastic member 92 by pressing a bolt 96 to an outer peripheral face of the elastic member 92.

The clearance 98 constitutes the margin of escaping the elastic member 92 elastically deformed by the synchronization error of feeding and rotation of the spindle 1 of the machine tool. Therefore, for example, the easiness of bending the elastic member 92 can be adjusted by changing a size of the clearance 98 by changing a size of the hollow portion 94 or the like, and the tap holder 10 suitable for machining various kinds of materials can be provided.

Further, the contact area of the locking shaft portion 74 and the elastic member 92 can be made to differ from each other by the case of operating the force in the pressing direction to the tap collet 50 and the case of operating the force in the pulling direction thereto, and the easinesses of bending the elastic member 92 in the respective cases can individually be adjusted.

Figure 18:
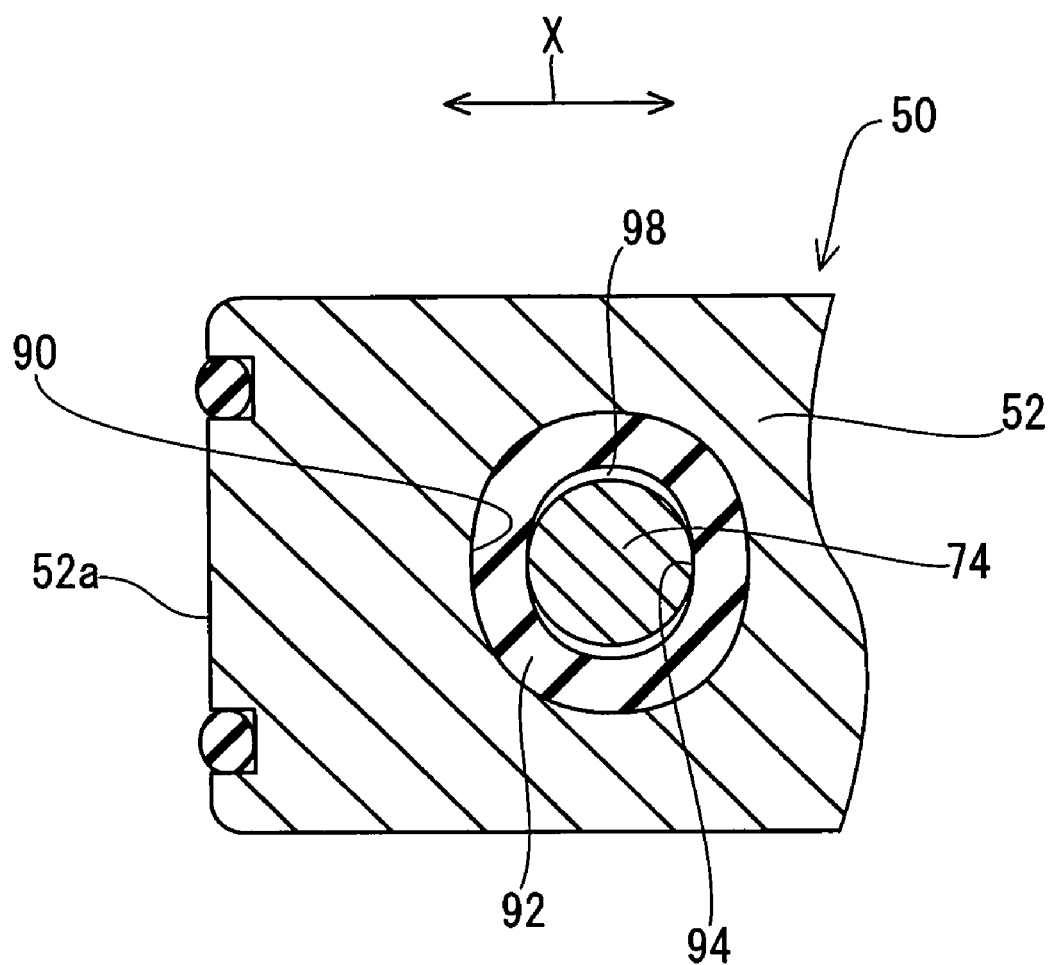
FIG. 18 is a partial sectional view of a tap collet in a state of being inserted with a locking member showing modified example 4 of the third embodiment of the invention.
Figure 19:
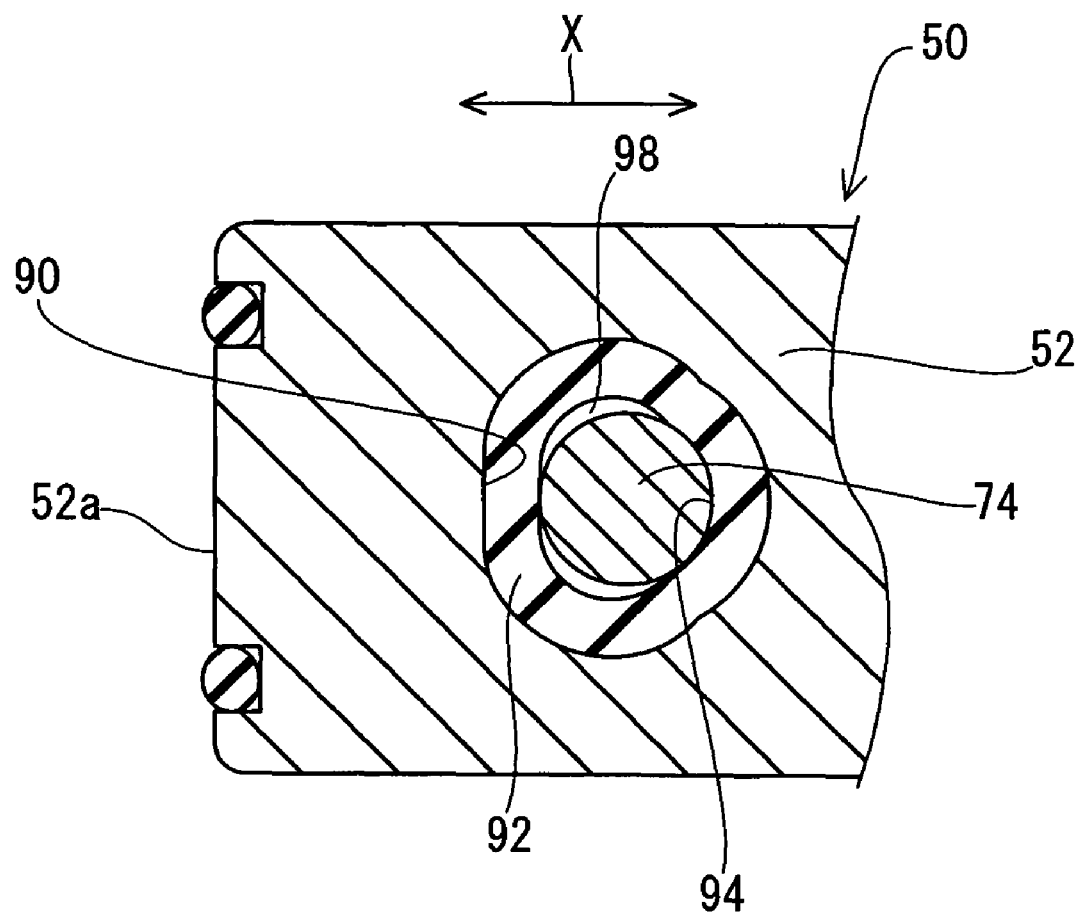
FIG. 19 is a partial sectional view of a tap collet in a state of being inserted with a locking member showing modified example 4 of the third embodiment of the invention.
Figure 20:
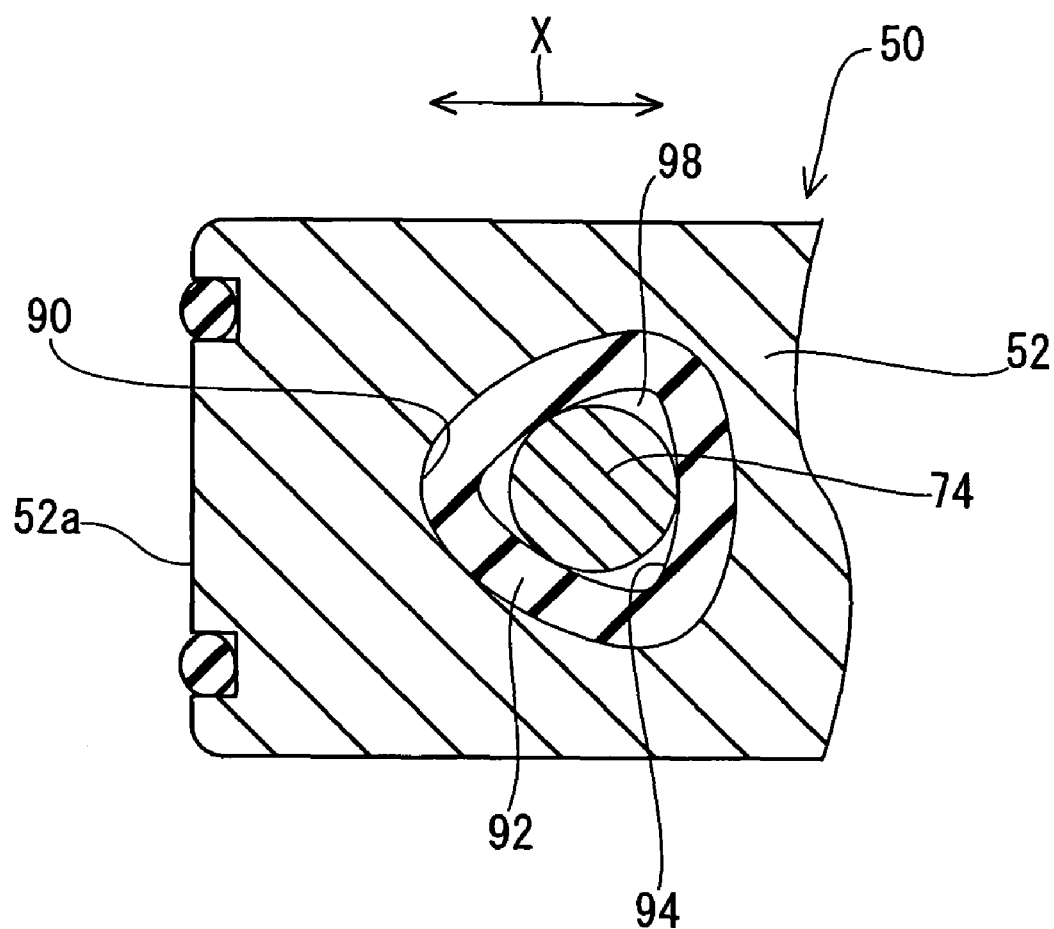
FIG. 20 is a partial sectional view of a tap collet in a state of being inserted with a locking member showing modified example 4 of the third embodiment of the invention.

Further, other than the modified example, for example, the clearance 98 may be formed between the locking shaft portion 74 and the elastic member 92 by inserting the elastic member 92 substantially in a shape of a concentric cylinder into the third recessed portion 90 sectional shapes of which are provided in an elliptical shape, a shape of a triangle having rounded corners and the like as shown by FIG. 18 through FIG. 20. In this way, also the sectional shape of the hollow portion 94 can be changed by changing the sectional shape of the third recessed portion 90, and therefore, the contact area of the locking shaft portion 74 and the elastic member 92 can be changed by the case of operating the force in the pressing direction to the tap collet 50 and the case of operating the force in the pulling direction thereto, and the easinesses of bending the elastic member 92 can separately be adjusted in the respective cases.

Modified Example 5 of Third Embodiment

Figure 21:
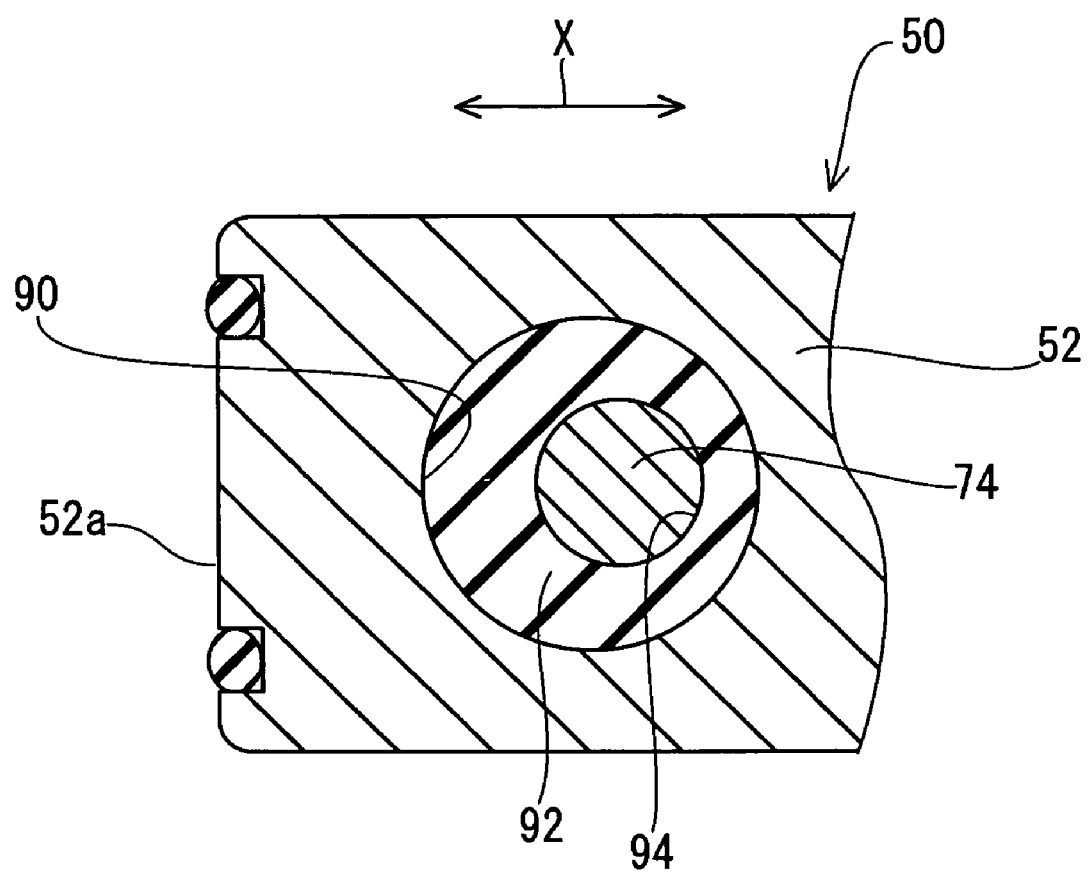
FIG. 21 is a partial sectional view of a tap collet in a state of being inserted with a locking member showing modified example 5 of the third embodiment of the invention.
Figure 22:
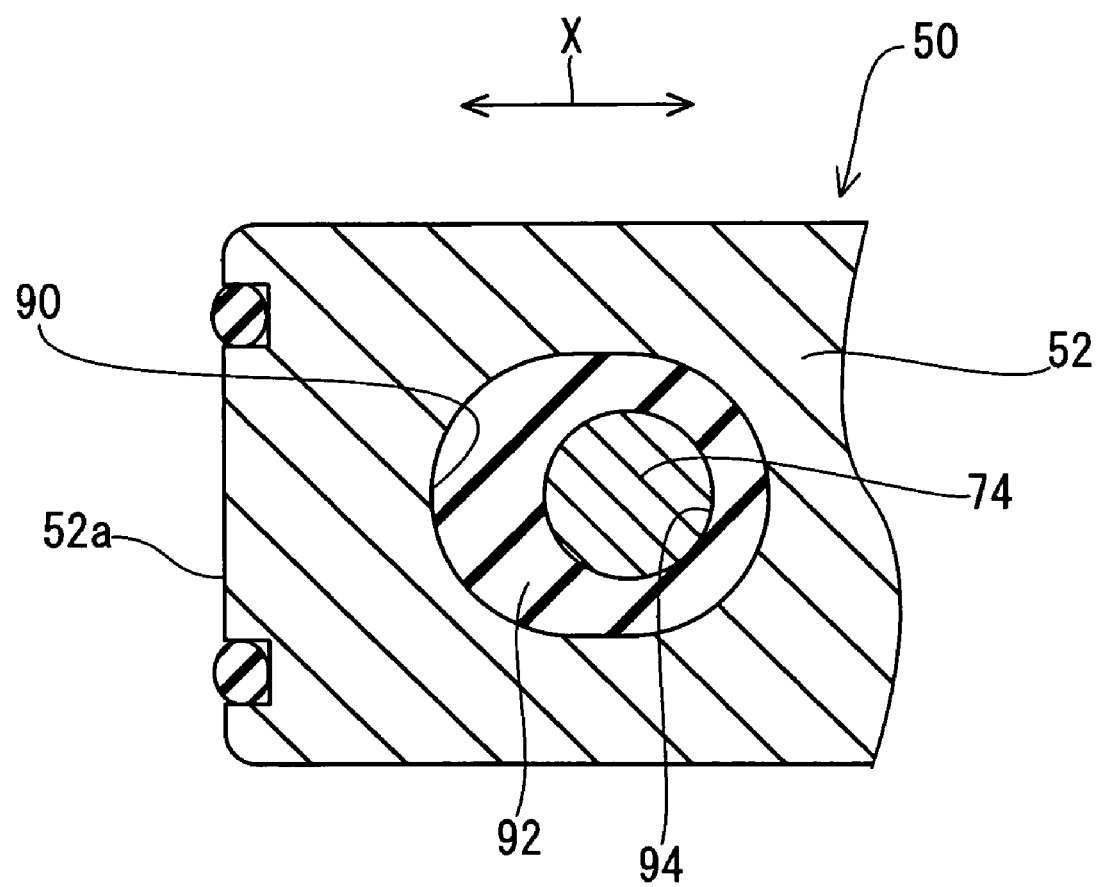
FIG. 22 is a partial sectional view of the tap collet in the state of being inserted with the locking member showing modified example 5 of the third embodiment of the invention.
Figure 23:
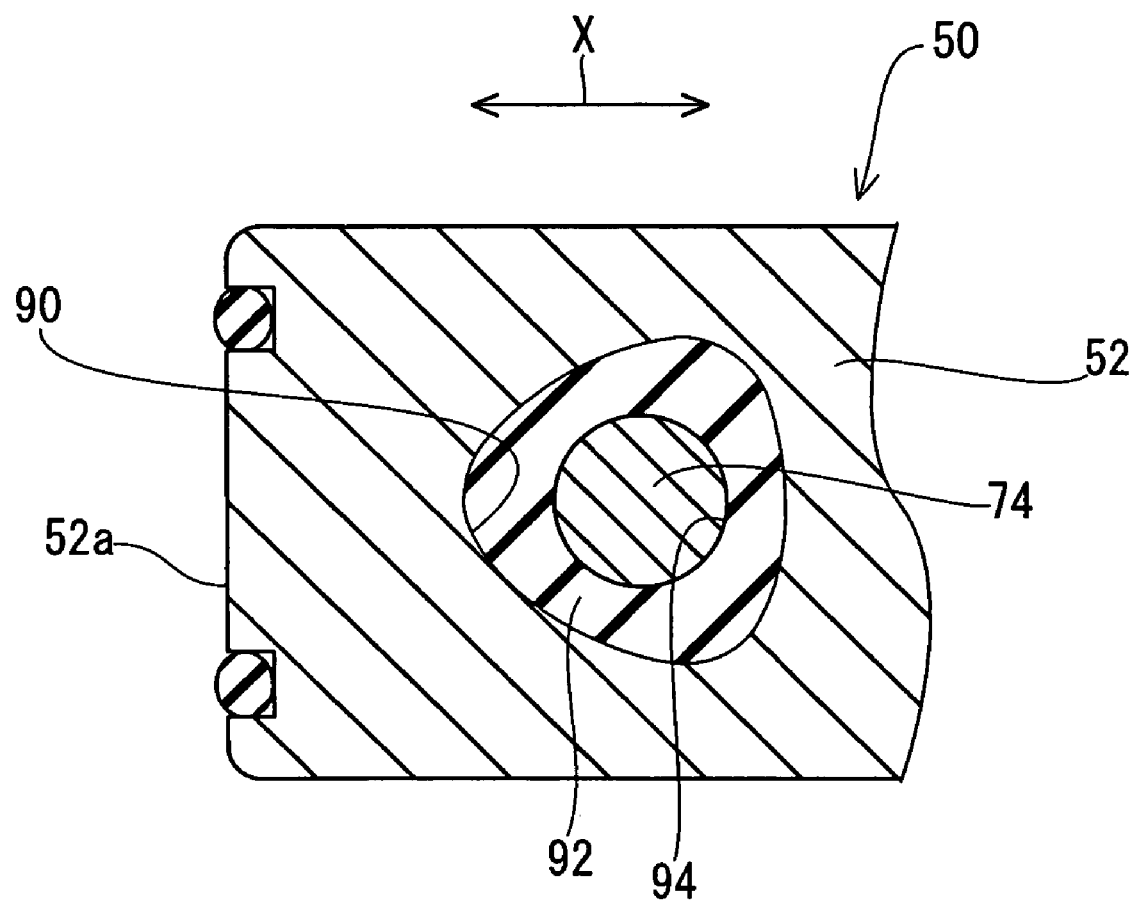
FIG. 23 is a partial sectional view of the tap collet in the state of being inserted with the locking member showing modified example 5 of the third embodiment of the invention.

Modified example 5 of the embodiment will be explained in reference to FIG. 21 through FIG. 23. Elements the same as or corresponding to those of the embodiment are attached with the same notations and a duplicated explanation thereof will be omitted. FIG. 21 through FIG. 23 are partial sectional views of the tap collet 50 in the state of being inserted with the locking member 70.

According to the modified example, as exemplified in FIG. 21 through FIG. 23, the elastic member 92 interposed between the locking shaft portion 74 and the shaft portion 52 of the tap collet 50 on one side in the axial direction indicated by the arrow mark notation X (front side in a direction of pressing the tap collet 50 according to the modified example) is formed to be more thick-walled than the elastic member 92 interposed between the locking shaft portion 74 and the shaft portion 52 of the tap collet 50 on other side (rear side in the direction of pressing the tap collet 50 according to the modified example). Thereby, the easinesses of bending the elastic member 92 can respectively separately be adjusted in the case of operating the force in the pressing direction to the tap collet 50 and the case of operating the force in the pulling direction thereto.

Further, although according to the modified example, the elastic member 92 on the front side in the pressing direction of the tap collet 50 is provided to be more thick-walled, the elastic member 92 on the rear side in the pressing direction of the tap collet 50 may be provided to be more thick-walled.

The invention claimed is:

1. A tap holder for chucking a tap at one end thereof, comprising:
   a tap collet having one end and another end, said one end being configured to chuck a tap;
   a tapper body receiving an outer face side of said other end of the tap collet in an axial direction of the tapper body to fix the tap collet unrotatably, and said tapper body being configured so as to be attachable to a machine tool having a tap synchronizing feeding mechanism, collet being removably inserted into the tapper body;
   a locking member inserted through the tap collet and the tapper body at portions of the tap collet and the tapper body overlapping each other;
   an elastic member, wherein the locking member interlocks the tap collet and the tapper body in a state of interposing the elastic member on both sides in an axial direction between the locking member and at least one of the tap collet and the tapper body; and
   the locking member including a locking shaft portion having a first recessed portion at a peripheral face of the locking shaft portion thereof, the locking shaft portion being inserted through the tap collet and the tapper body and the elastic member being arranged at the first recessed portion.

2. The tap holder according to claim 1, wherein the first recessed portion is formed continuously in a peripheral direction of the locking shaft portion.

3. The tap holder according to claim 1, wherein the first recessed portion includes a plurality of the first recessed portions disposed spaced apart from each other by intervals thereamong in an axial direction of the locking shaft portion.

4. A tap holder for chucking a tap at one end thereof, comprising:
   a tap collet having one end and another end, said one end being configured to chuck a tap;
   a tapper body receiving an outer face side of said other end of the tap collet in an axial direction of the tapper body to fix the tap collet unrotatably, and said tapper body being configured so as to be attachable to a machine tool having a tap synchronizing feeding mechanism, the tap collet being removably inserted into the tapper body;
   a locking member inserted through the tap collet and the tapper body at portions of the tap collet and the tapper body overlapping each other;
   an elastic member, wherein the locking member interlocks the tap collet and the tapper body in a state of interposing the elastic member on both sides in an axial direction between the locking member and at least one of the tap collet and the tapper body; and an elastic member unit including a cylindrical member formed with a cylindrical member recessed portion at least one of an inner peripheral face of a hollow portion of the cylindrical member and an outer peripheral face of the cylindrical member and the elastic member arranged at the cylindrical member recessed portion, and the cylindrical member is inserted through at least one of the tap collet and the tapper body;

wherein the locking member is inserted through the hollow portion of the cylindrical member.

5. A tap holder for chucking a tap at one end thereof, comprising: a tap collet having one end and another end, said one end being configured to chuck a tap; a tapper body receiving an outer face side of said other end of the tap collet in an axial direction of the topper body to fix the tap collet unrotatably, and said tapper body being configured so as to be attachable to a machine tool having a tap synchronizing feeding mechanism, the tap collet being removably inserted into the tapper body; a locking member inserted through the tap collet and the tapper body at portions of the tap collet and the tapper body overlapping each other; an elastic member, wherein the locking member interlocks the tap collet and the tapper body in a state of interposing the elastic member on both sides in an axial direction between the locking member and at least one of the tap collet and the tapper body; and a recessed portion provided at least one of the tap collet an the tapper body and the elastic member is disposed in the recess portion, and the recessed portion is provided by penetrating the tap collet.

6. A tap holder for chucking a tap at one end thereof, comprising: a tap collet having one end and another end, said one end being configured to chuck a tap; a tapper body receiving an outer face side of said other end of the tap collet in an axial direction of the tapper body to fix the tap collet unrotatably, and said tapper body being configured so as to be attachable to a machine tool having a tap synchronizing feeding mechanism, the tap collet being removably into the tapper body; a locking member inserted through the tap collet and the tapper body at portions of the tap collet and the tapper body overlapping each other; an elastic member, wherein the locking member interlocks the tap collet and the tapper booty in a state of interposing the elastic member on both sides in an axial direction between the locking member and at least one of the tap collet and the tapper body; a recessed portion provided at least one tap collet and the tapper body and the elastic member is disposed in the recessed portion, and a face of the elastic member being brought into contact with at least one of the locking member and the tap collet and the tapper body being constituted by a recessed and projected face; the tap collet and tapper body are provided with holes through which the locking member passes; and the recessed portion being formed in an inner circumferential surface of at least one hole of the holes of the tap collet and the tapper body.

7. A tap holder for chucking a tap at one end thereof, comprising: a tap collet having one end and another end, said one end being configured to chuck a tap; a tapper body receiving an outer face side of said other end of the tap collet in an axial direction of the tapper body to fix the tap collet unrotatably, and said tapper body being configured so as to be attachable to a machine tool having a tap synchronizing feeding mechanism, the tap collet being removably inserted into the tapper body; a locking member inserted through the tap collet and the tapper body at portions of the tap collet and the tapper body overlapping each other; an elastic member, wherein the locking member interlocks the tap collet and the tapper body in a state of interposing the elastic member on both sides in an axial direction between the locking member and at least one of the tap collet and the tapper body; a recessed portion provided at least one of the tap collet and the tapper body and the elastic member is disposed in the recessed portion; a clearance being formed between the elastic member and the locking member at a portion in a peripheral direction of the locking member; the tap collet and the tapper body are provided with holes through which the locking member passes; and the recessed portion being formed in an inner circumferential surface of at least one of the holes of the tap collet and the tapper body.

8. The tap holder according to claim 5, 6, or 7, wherein: the elastic member interposed between the locking member and at least one of the tap collet and the tapper body on one side in the axial direction is formed to be more thick-walled than the elastic member interposed between the locking member and at least one of the tap collet and the tapper body on other side in the axial direction.

9. The tap holder according to claim 1, 4, 5, 6 or 7, further wherein the elastic member is interchangeably arranged.

* * * * *